United States Patent
Xue et al.

(10) Patent No.: US 12,155,492 B2
(45) Date of Patent: Nov. 26, 2024

(54) OUT-BAND PHYSICAL SIDELINK FEEDBACK CHANNEL (PSFCH) RESOURCES FOR SIDELINK UNLICENSED SPECTRUM

(71) Applicant: QUALCOMM Incorporated, San Diego, CA (US)

(72) Inventors: Yisheng Xue, San Diego, CA (US); Jing Sun, San Diego, CA (US); Chih-Hao Liu, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 358 days.

(21) Appl. No.: 17/697,354

(22) Filed: Mar. 17, 2022

(65) Prior Publication Data

US 2023/0299896 A1    Sep. 21, 2023

(51) Int. Cl.
*H04L 1/1867* (2023.01)
*H04L 1/1812* (2023.01)

(52) U.S. Cl.
CPC .......... *H04L 1/1896* (2013.01); *H04L 1/1812* (2013.01)

(58) Field of Classification Search
CPC ... H04L 1/1896; H04L 1/1812; H04L 1/1861; H04L 1/1893; H04L 5/0055; H04L 1/1685
See application file for complete search history.

(56) References Cited

U.S. PATENT DOCUMENTS

| | | | | |
|---|---|---|---|---|
| 2021/0127364 A1* | 4/2021 | Panteleev | ............. | H04L 1/1819 |
| 2021/0288778 A1 | 9/2021 | Park | | |
| 2022/0021508 A1 | 1/2022 | Xue et al. | | |
| 2022/0029747 A1 | 1/2022 | Xue et al. | | |
| 2022/0255680 A1 | 8/2022 | Moon et al. | | |
| 2022/0264533 A1* | 8/2022 | Zhang | .................... | H04W 72/02 |
| 2023/0083274 A1* | 3/2023 | Lee | ........................ | H04L 5/0044 370/329 |
| 2023/0388755 A1* | 11/2023 | Ganesan | ............... | H04L 1/1825 |

FOREIGN PATENT DOCUMENTS

WO    2020251237 A1    12/2020

OTHER PUBLICATIONS

International Search Report and Written Opinion—PCT/US2023/063356—ISA/EPO—May 25, 2023.

\* cited by examiner

*Primary Examiner* — Donald L Mills
(74) *Attorney, Agent, or Firm* — Patterson + Sheridan, LLP

(57) ABSTRACT

Certain aspects of the present disclosure provide a method for wireless communications by a transmitter user equipment (UE). The method may include receiving (e.g., from a network entity) a configuration of a first resource pool associated with a second resource pool. The first resource pool includes physical sidelink feedback channel (PSFCH) resources for hybrid automatic repeat request (HARQ) responses for physical sidelink shared channel (PSSCH) transmissions in the second resource pool. The method further includes transmitting (e.g., to a receiver UE) a PSSCH on a resource in the second resource pool and a request for a HARQ response for the PSSCH from a PSFCH resource in the first resource pool. The method further includes receiving (e.g., from the receiver UE) the HARQ response over the PSFCH resource (e.g., in response to the PSSCH).

30 Claims, 22 Drawing Sheets

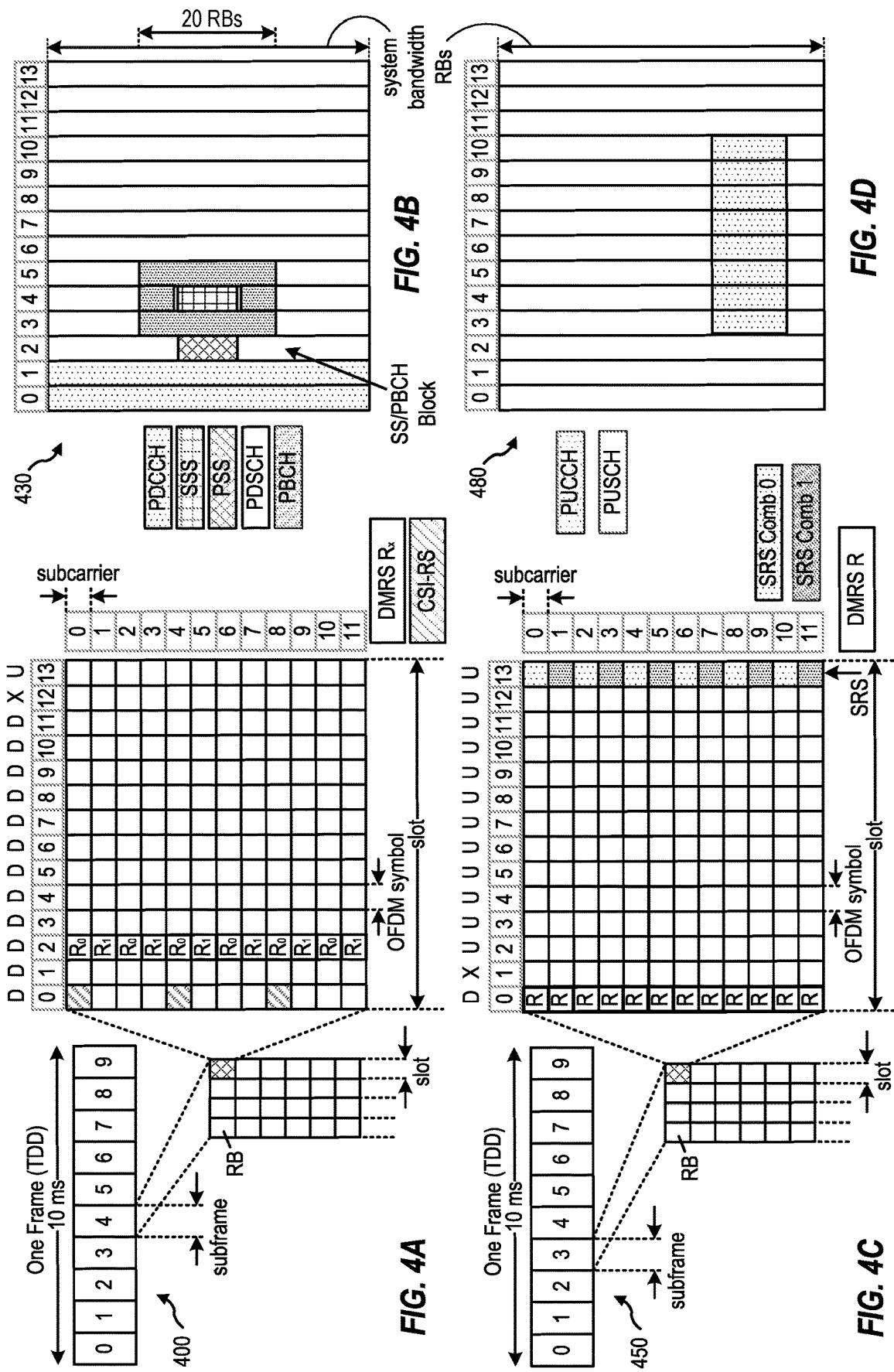

2000

A method for wireless communications by a receiver user equipment (UE)

2010

Receiving a physical sidelink shared channel (PSSCH) on a resource in a second resource pool from a transmitter UE configured with a configuration of a first resource pool associated with the second resource pool, wherein the first resource pool comprises physical sidelink feedback channel (PSFCH) resources for hybrid automatic repeat request (HARQ) responses for PSSCH transmissions in the second resource pool

2020

Receiving, from the transmitter UE, a request for a HARQ response for the PSSCH from a PSFCH resource in the first resource pool

2030

Transmitting, to the transmitter UE, the HARQ response over the PSFCH resource in response to the PSSCH

FIG. 20

OUT-BAND PHYSICAL SIDELINK FEEDBACK CHANNEL (PSFCH) RESOURCES FOR SIDELINK UNLICENSED SPECTRUM

BACKGROUND

Field of the Disclosure

Aspects of the present disclosure relate to wireless communications, and more particularly, to techniques for managing out-band physical sidelink feedback channel (PSFCH) resources for sidelink unlicensed spectrum.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications by a transmitter user equipment (UE), comprising: receiving, from a network entity, a configuration of a first resource pool associated with a second resource pool, wherein the first resource pool comprises physical sidelink feedback channel (PSFCH) resources for hybrid automatic repeat request (HARQ) responses for physical sidelink shared channel (PSSCH) transmissions in the second resource pool; transmitting, to a receiver UE, a PSSCH on a resource in the second resource pool; transmitting, to the receiver UE, a request for a HARQ response for the PSSCH from a PSFCH resource in the first resource pool; and receiving, from the receiver UE, the HARQ response over the PSFCH resource in response to the PSSCH.

Another aspect provides a method for wireless communications by a receiver UE, comprising: receiving a PSSCH on a resource in a second resource pool from a transmitter UE configured with a configuration of a first resource pool associated with the second resource pool, wherein the first resource pool comprises PSFCH resources for HARQ responses for PSSCH transmissions in the second resource pool; receiving, from the transmitter UE, a request for a HARQ response for the PSSCH from a PSFCH resource in the first resource pool; and transmitting, to the transmitter UE, the HARQ response over the PSFCH resource in response to the PSSCH.

Other aspects provide: an apparatus operable, configured, or otherwise adapted to perform the aforementioned methods as well as those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 4A, 4B, 4C, and 4D depict various example aspects of data structures for a wireless communications network.

FIG. 20 depicts a method for wireless communications by a receiver UE.

DETAILED DESCRIPTION

Aspects of the present disclosure provide apparatuses, methods, processing systems, and computer-readable mediums for managing out-band physical sidelink feedback channel (PSFCH) resources for sidelink unlicensed spectrum.

New radio (NR) sidelink has been used for vehicle-to-everything (V2X) communications over licensed bands. Recently, 3rd generation partnership project (3GPP) has supported the sidelink for other applications (other than the V2X). So far, efforts to use the sidelink for the other applications have been limited to the licensed bands, yet not every other application can access the licensed bands. Techniques described herein provide improvements with respect to a hybrid automatic repeat request (HARQ) response for a sidelink deployment over a frequency range 1 (FR1) unlicensed band that is imposed with a listen before talk (LBT) based channel access.

For example, the techniques described herein arrange a physical sidelink feedback channel (PSFCH)-only resource pool in a licensed carrier and attach it to a regular resource pool configured in an unlicensed carrier requiring a LBT. When the PSFCH-only resource pool is attached to the regular resource pool, an out-band resource in the PSFCH-only resource pool can only be accessed after receiving a sidelink control information (SCI) in the regular resource pool. In other words, the PSFCH-only resource pool includes out-band resources for a HARQ response with respect to a physical sidelink shared channel (PSSCH) transmitted in the regular resource pool, and a transmitter user equipment (UE) can request the HARQ response from one PSFCH resource in the PSFCH-only resource pool when transmitting over a subchannel in the regular resource pool. The techniques described herein may result in a higher data rate and improved spectral efficiency.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

Figure 1:
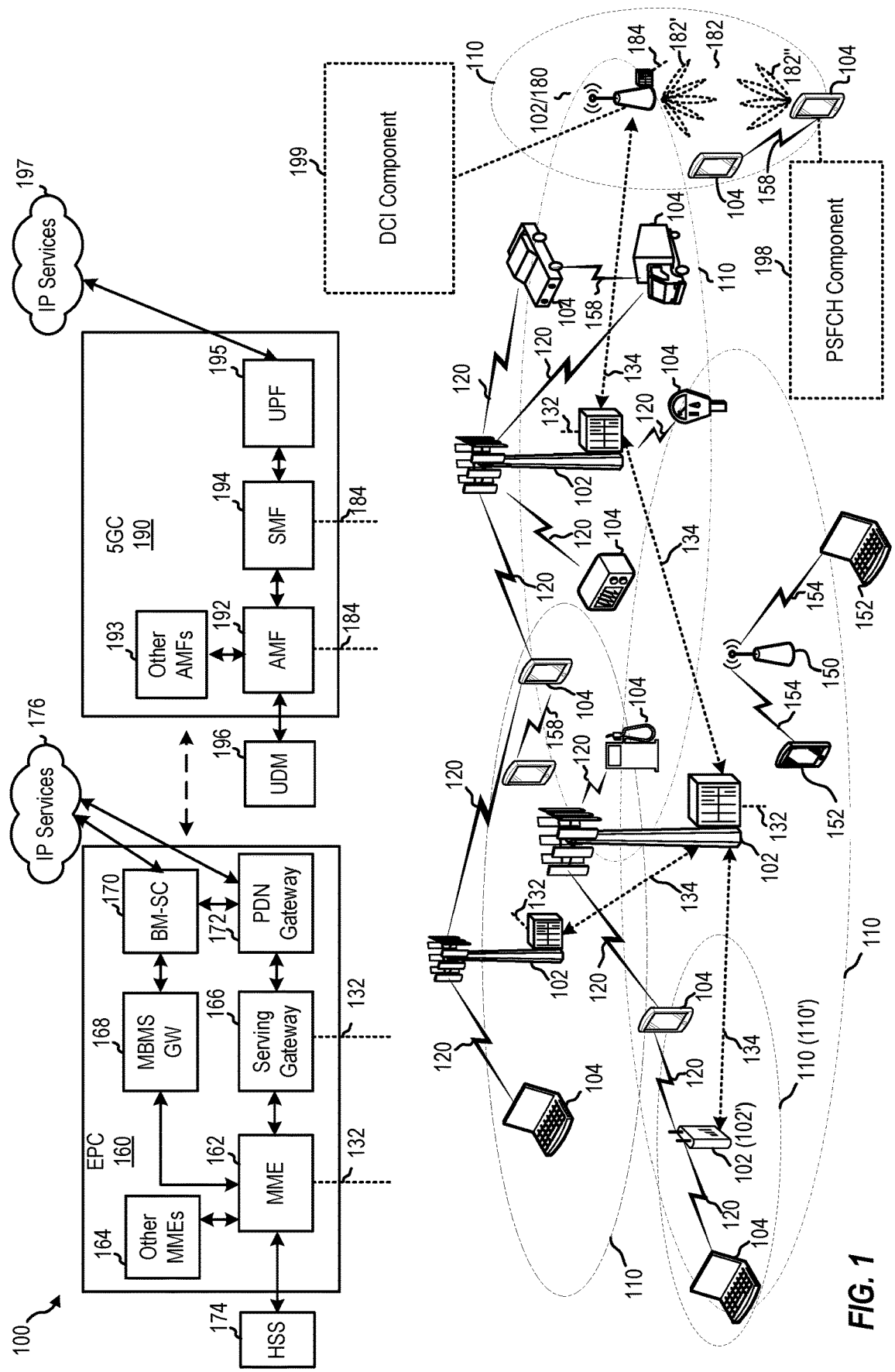
FIG. 1 depicts an example wireless communications network.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and UEs.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio BS, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
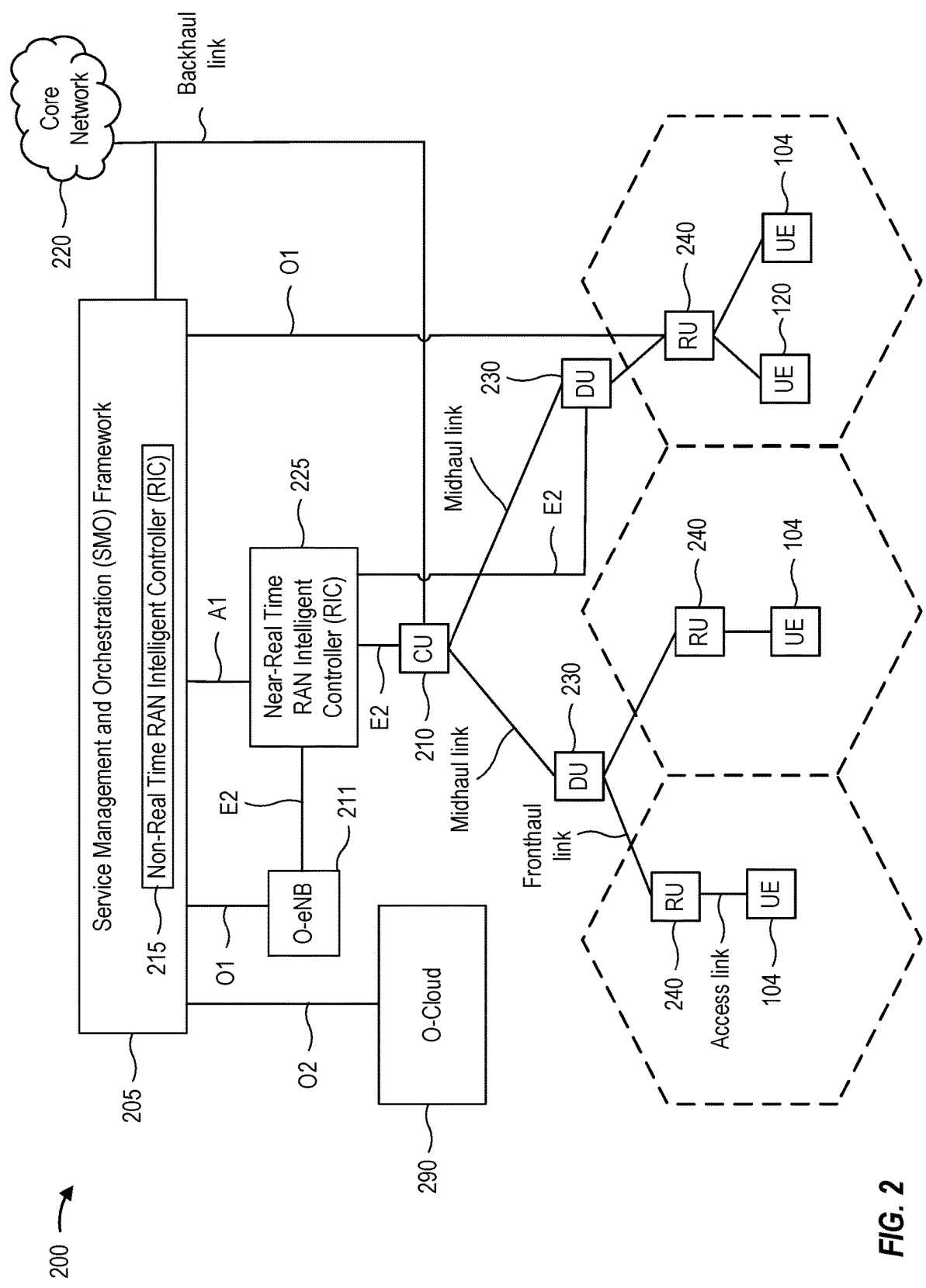
FIG. 2 depicts an example disaggregated base station (BS) architecture.

While BSs 102 are depicted in various aspects as unitary communications devices, BSs 102 may be implemented in various configurations. For example, one or more components of a BS 102 may be disaggregated, including a central unit (CU), one or more distributed units (DUs), one or more radio units (RUs), a Near-Real Time (Near-RT) RAN Intelligent Controller (MC), or a Non-Real Time (Non-RT) RIC, to name a few examples. In another example, various aspects of a BS 102 may be virtualized. More generally, a BS (e.g., BS 102) may include components that are located at a single physical location or components located at various physical locations. In examples in which a BS 102 includes components that are located at various physical locations, the various components may each perform functions such that, collectively, the various components achieve functionality that is similar to a BS 102 that is located at a single physical location. In some aspects, a BS 102 including components that are located at various physical locations may be referred to as a disaggregated radio access network (RAN) architecture, such as an Open RAN (O-RAN) or Virtualized RAN (VRAN) architecture. FIG. 2 depicts and describes an example disaggregated BS architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 600 MHz-6 GHz, which is often referred to (interchangeably) as "Sub-6 GHz". Similarly, 3GPP currently defines Frequency Range 2 (FR2) as including 26-41 GHz, which is sometimes referred to (interchangeably) as a "millimeter wave" ("mmW" or "mmWave"). A BS configured to communicate using mmWave/near mmWave radio frequency bands (e.g., a mmWave BS such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain BSs (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

Figure 19:
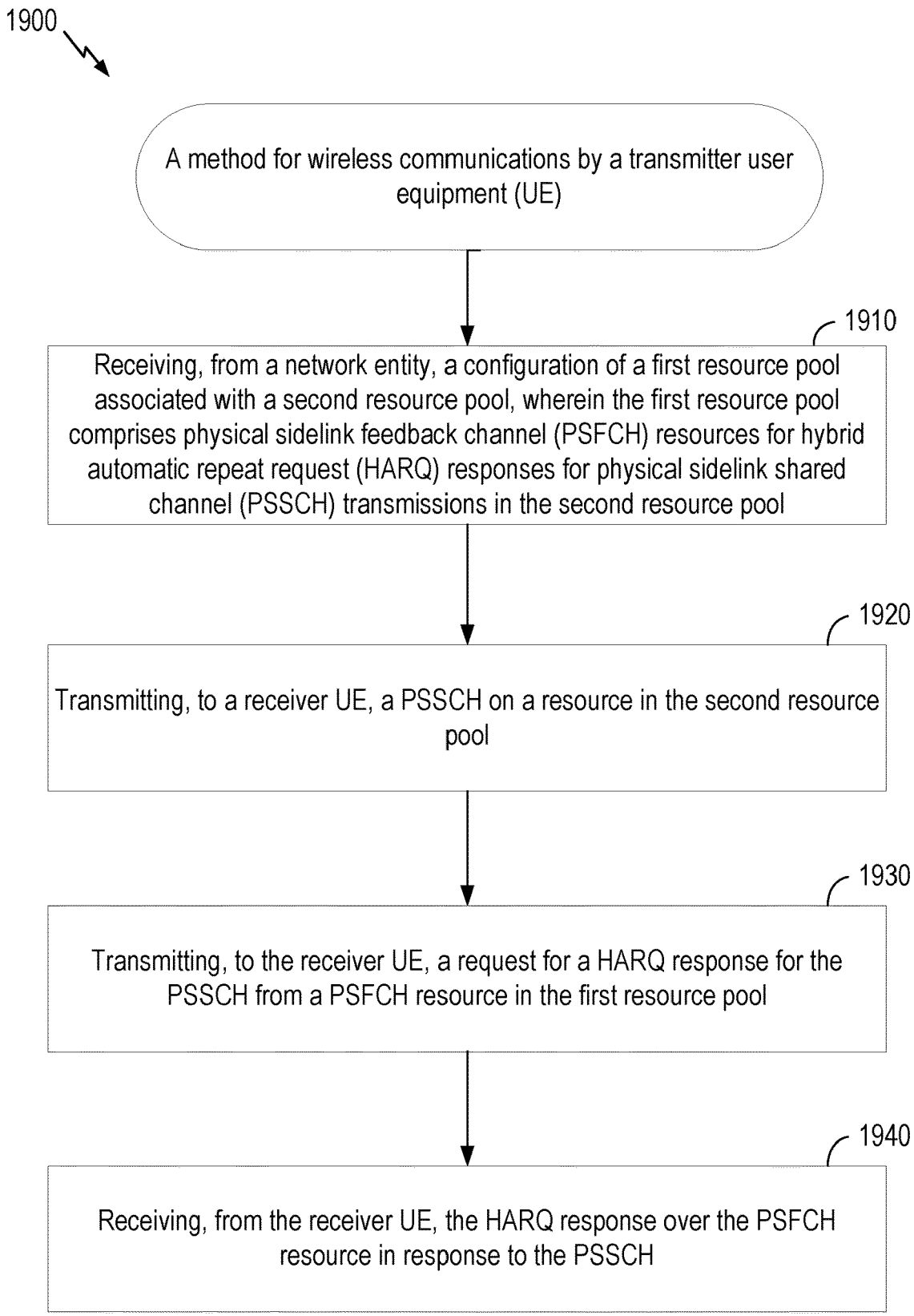
FIG. 19 depicts a method for wireless communications by a transmitter UE.

Wireless communication network 100 further includes physical sidelink feedback channel (PSFCH) component 198, which may be configured to perform operations 1900 of FIG. 19 and/or operations 2000 of FIG. 20. Wireless communication network 100 further includes downlink control information (DCI) component 199.

In various aspects, a network entity or network node can be implemented as an aggregated BS, as a disaggregated BS, a component of a BS, an integrated access and backhaul (IAB) node, a relay node, a sidelink node, to name a few examples.

FIG. 2 depicts an example disaggregated BS 200 architecture. The disaggregated BS 200 architecture may include one or more central units (CUs) 210 that can communicate directly with a core network 220 via a backhaul link, or indirectly with the core network 220 through one or more disaggregated BS units (such as a Near-Real Time (Near-RT) RAN Intelligent Controller (MC) 225 via an E2 link, or a Non-Real Time (Non-RT) MC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more BS functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an AI interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT MC 215 or the Near-RT MC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via 01) or via creation of RAN management policies (such as AI policies).

Figure 3:
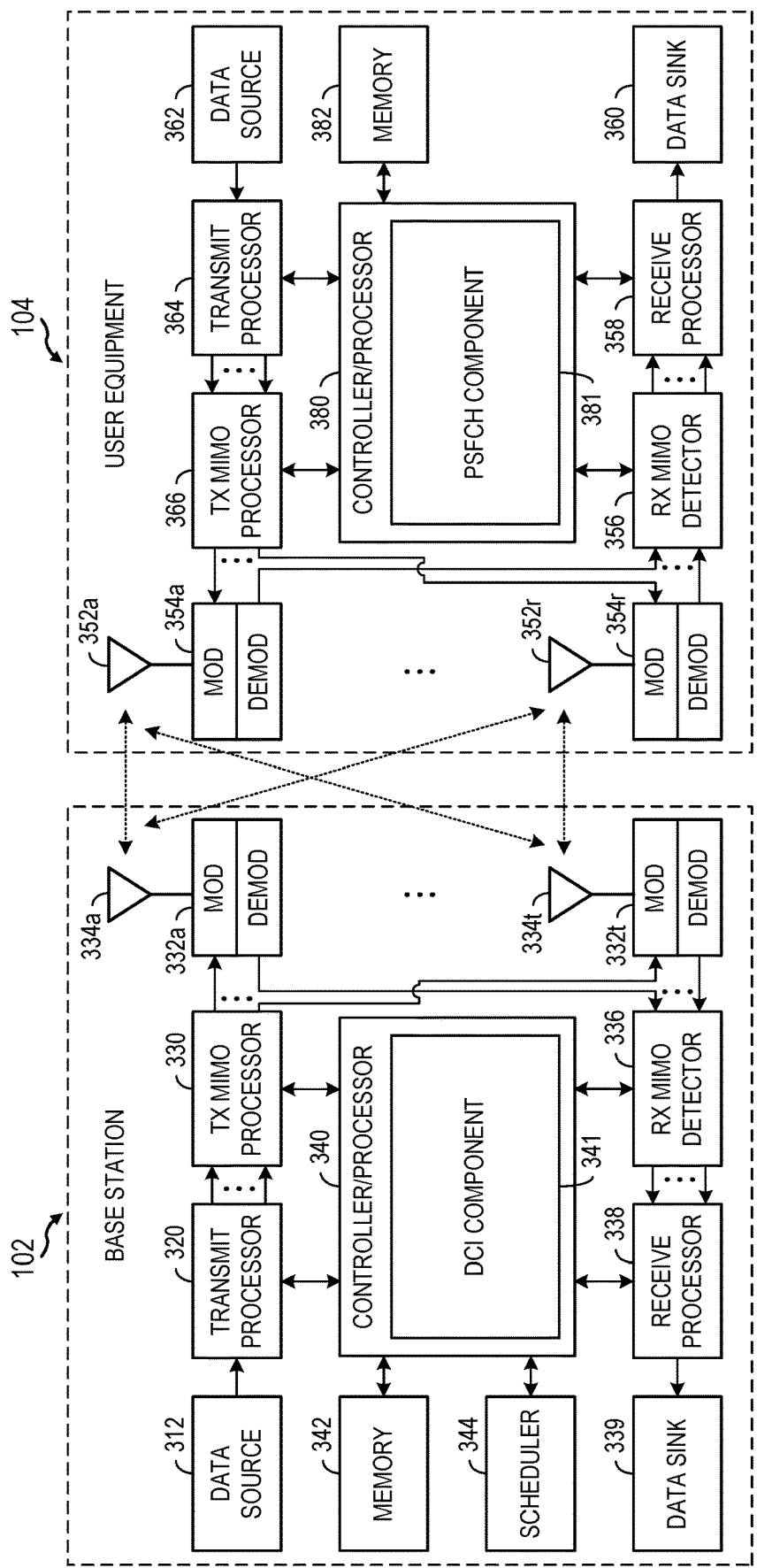
FIG. 3 depicts aspects of an example BS and an example user equipment (UE).

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

BS 102 includes controller/processor 340, which may be configured to implement various functions related to wireless communications. In the depicted example, controller/processor 340 includes DCI component 341, which may be representative of DCI component 199 of FIG. 1. Notably, while depicted as an aspect of controller/processor 340, DCI component 341 may be implemented additionally or alternatively in various other aspects of BS 102 in other implementations.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

UE 104 includes controller/processor 380, which may be configured to implement various functions related to wireless communications. In the depicted example, controller/processor 380 includes PSFCH component 381, which may be representative of PSFCH component 198 of FIG. 1. Notably, while depicted as an aspect of controller/processor 380, PSFCH component 381 may be implemented additionally or alternatively in various other aspects of UE 104 in other implementations.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the BS. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a BS for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Example Sidelink Communication

User equipments (UEs) communicate with each other using sidelink signals. Real-world applications of sidelink communications may include UE-to-network relaying, vehicle-to-vehicle (V2V) communications, vehicle-to-everything (V2X) communications, Internet of Everything (IoE) communications, IoT communications, mission-critical mesh, and/or various other suitable applications.

A sidelink signal refers to a signal communicated from one UE to another UE without relaying that communication through a scheduling entity (e.g., UE or a network entity), even though the scheduling entity may be utilized for scheduling and/or control purposes. In some examples, the sidelink signal is communicated using a licensed spectrum (e.g., unlike wireless local area networks, which typically use an unlicensed spectrum). One example of sidelink communication is PC5, for example, as used in V2V, long term evolution (LTE), and/or new radio (NR).

Various sidelink channels are used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH carries discovery expressions that enable proximal UEs to discover each other. The PSCCH carries control signaling such as sidelink resource configurations, resource reservations, and other parameters used for data transmissions. The PSSCH carries data transmissions. The PSFCH carries a feedback such as acknowledgement (ACK) and/or negative ACK (NACK) information corresponding to transmissions on the PSSCH.

In some NR systems, a two stage sidelink control information (SCI) is supported. The two stage SCI includes a first stage SCI (e.g., SCI-1) and a second stage SCI (e.g., SCI-2). The SCI-1 includes resource reservation and allocation information. The SCI-2 includes information that can be used to decode data and to determine whether a UE is an intended recipient of a transmission. The SCI-1 and/or the SCI-2 may be transmitted over a PSCCH.

Figure 5B:
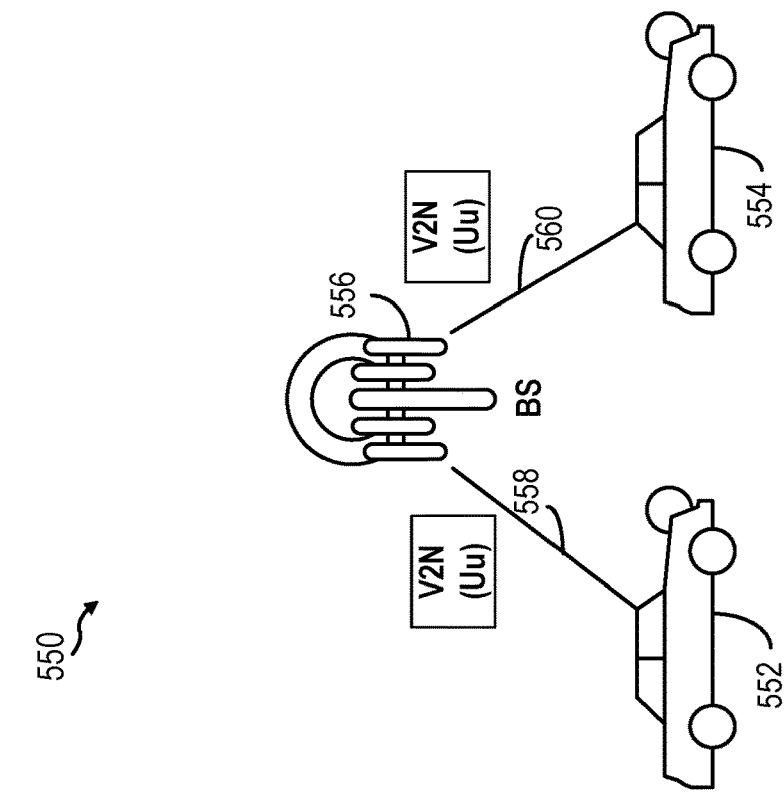
FIGS. 5A-5B depict diagrammatic representations of example vehicle-to-everything (V2X) systems.
Figure 5A:
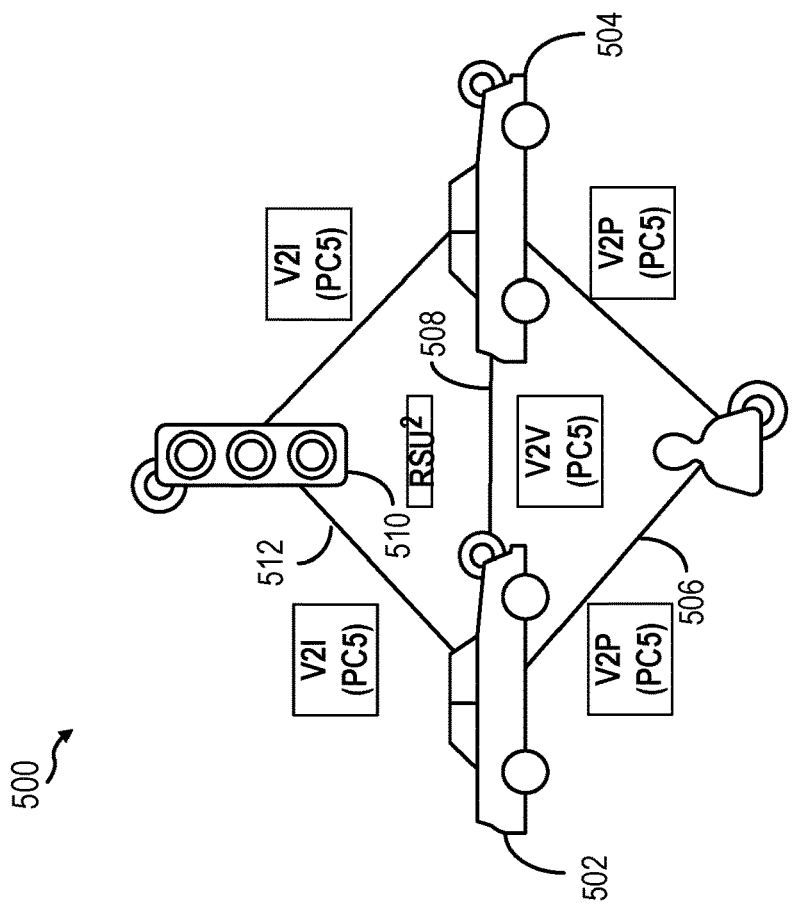

FIG. 5A and FIG. 5B show diagrammatic representations of example V2X systems. For example, vehicles shown in FIG. 5A and FIG. 5B communicate via sidelink channels and relay sidelink transmissions. V2X is a vehicular technology system that enables vehicles to communicate with traffic and an environment around them using short-range wireless signals, known as sidelink signals.

The V2X systems shown in FIG. 5A and FIG. 5B provide two complementary transmission modes. A first transmission mode, shown by way of example in FIG. 5A, involves direct communications (e.g., also referred to as sidelink communications) between participants in proximity to one another in a local area. A second transmission mode, shown by way of example in FIG. 5B, involves network communications through a network, which may be implemented over a Uu interface (for example, a wireless communication interface between a radio access network (RAN) and a UE).

Referring to FIG. 5A, a V2X system 500 (e.g., including V2V communications) is illustrated with two vehicles 502, 504. A first transmission mode allows for direct communication between different participants in a given geographic location. As illustrated, a vehicle 502 can have a wireless communication link 506 with an individual through a PC5 interface. Communications between the vehicles 502 and 504 may also occur through a PC5 interface 508. In a like manner, communication may occur from the vehicle 502 to other highway components (e.g., a roadside unit (RSU) 510), such as a traffic signal or sign through a PC5 interface 512. With respect to each communication link illustrated in FIG. 5A, two-way communication may take place between devices, therefore each device may be a transmitter and a receiver of information. The V2X system 500 is a self-managed system implemented without assistance from a network entity. A self-managed system may enable improved spectral efficiency, reduced cost, and increased reliability as network service interruptions do not occur during handover operations for moving vehicles. The V2X system 500 is configured to operate in a licensed or unlicensed spectrum, thus any vehicle with an equipped system may access a common frequency and share information. Such harmonized/common spectrum operations allow for safe and reliable operation.

FIG. 5B shows a V2X system 550 for communication between a vehicle 552 and a vehicle 554 through a network entity 556. Network communications may occur through discrete nodes, such as a network entity 556 that sends and receives information to and from (e.g., relays information between) the vehicles 552, 554. The network communications through vehicle to network (V2N) links 558 and 560 may be used, for example, for long-range communications between the vehicles 552, 554, such as for communicating the presence of a car accident a distance ahead along a road or highway. Other types of communications may be sent by a wireless node to the vehicles 552, 554, such as traffic flow conditions, road hazard warnings, environmental/weather reports, and service station availability, among other examples. Such data can be obtained from cloud-based sharing services.

Example Hybrid Automatic Repeat Request (HARQ) Feedback

Communications between devices may include the use of feedback signaling. One form of feedback is a hybrid automatic repeat request (HARQ) feedback. The HARQ feedback is provided by a receiving device to a sending device, and may include transmission of various reporting signals to the sending device. Example reporting signals may include acknowledgement (ACK) signals representing an ACK state, and negative acknowledgement (NAK) signals representing a NAK state. An ACK signal may be transmitted as part of HARQ feedback in response to successful reception and decoding of a data transmission. A NAK signal may be transmitted as part of HARQ feedback in response to a reception of a data transmission but an unsuccessful decoding of the data transmission.

Example Hybrid Automatic Repeat Request (HARQ) in Vehicle-to-Everything (V2X) Focused New Radio (NR) Sidelink A new radio (NR) sidelink system is used for vehicle-to-everything (V2X) communications to exchange safety related messages among vehicular user equipments (UEs) (e.g., over sub-6 GHz intelligent transport systems (ITS)/licensed bands).

In some cases, a hybrid automatic repeat request (HARQ) is used for a higher efficiency and improved reliability over a cellular vehicle-to-everything (CV2X) system (e.g., in long term evolution (LTE)). For example, a transmitter UE may carry a codepoint in a sidelink control information (SCI) to a receiver UE to request a HARQ response (e.g., for unicast traffic or groupcast traffic) from the receiver UE. Upon receiving the request via the SCI, the receiver UE sends the HARQ response to the transmitter UE over a physical sidelink feedback channel (PSFCH).

In some cases, PSFCH resources are arranged as resource pool wise common resources. For example, the PSFCH resources are included in a configuration of a resource pool of the transmitter UE (e.g., after sending the HARQ response request to the receiver UE, the transmitter UE knows when and where to receive the HARQ response from the receiver UE). In another example, the PSFCH resources are included in a configuration of a resource pool of the receiver UE (e.g., after receiving the HARQ response request from the transmitter UE, the receiver UE knows when and where to send the HARQ response to the transmitter UE).

Figure 6:
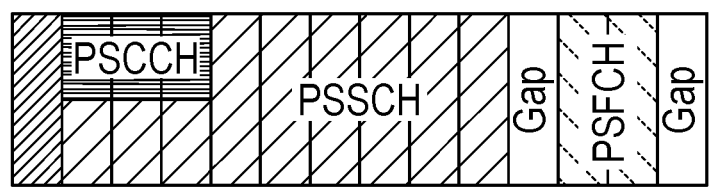
FIG. 6 depicts example physical sidelink feedback channel (PSFCH) time division multiplexed (TDMed) with a physical sidelink shared channel (PSSCH) in a slot.

In some cases, a PSFCH is time division multiplexed (TDMed) with a physical sidelink shared channel (PSSCH) in a slot (e.g., as illustrated in FIG. 6), and is allocated within frequency domain resources of a resource pool (i.e., in-band & TDMed signaling).

In some cases, a discontinuous reception (DRX) in NR is provided for battery-powered UEs, and inter-UE coordination is provided to improve reliability of Mode 2 based resource allocation. In addition, sidelink applications have been limited to sub-6 GHz licensed/ITS bands, and not every sidelink application can access to sub-6 GHz licensed/ITS bands.

In some cases, a sidelink may be deployed over other bands. For example, the the sidelink may be deployed on a frequency range 1 (FR1) unlicensed spectrum for both a Mode 1 and the Mode 2 where Uu operation for the Mode 1 is limited to a licensed spectrum (e.g., with possible scope of evaluation methodology for a sidelink operation on the unlicensed spectrum, a sidelink channel access mechanism for the unlicensed spectrum, and/or required changes to channel structures and procedures to operate on the unlicensed spectrum).

The present disclosure describes enhancement with respect to a HARQ response for a sidelink over a FR1 unlicensed band that is imposed with a listen before talk (LBT) based channel access. The present disclosure further describes that a PSFCH may be blocked by the LBT (i.e., LBT uncertainty), and in-band TDMed PSFCH resources may block continuous transmission within a channel occupancy time (COT).

Example Listen Before Talk (LBT), Channel Occupancy Time (COT), and Time Division Multiplexed (TDMed) Physical Sidelink Feedback Channel (PSFCH) Resources In some cases, a listen before talk (LBT) is implemented for co-existence among different radio access technologies (RATs) over 5 GHz and 6 GHz unlicensed spectrum. For example, a first user equipment (UE) (e.g., a first channel access node) performs a Type 1 LBT procedure (e.g., lasting up to more than 9 ms) to obtain a channel occupancy time (COT) for a continuous transmission (e.g., up to 10 ms). The first UE continuously transmits within the COT before leaving a gap (e.g., being larger than 16 us). The COT is shared with a second UE upon a Type 2 LBT procedure (e.g., gNodeB (gNB)-to-UE and UE-to-gNB COT sharing provided in new radio unlicensed (NR-U)).

In some cases, RATs such as Wi-Fi, long term evolution (LTE) limited assisted access (LAA), and NR-U are capable of performing continuous transmissions within a COT. However, in some cases, a presence of in-band time division multiplexed (TDMed) physical sidelink feedback channel (PSFCH) resources may stop a UE (e.g., the COT owner) from performing continuous transmissions. Specifically, the UE may need to switch to receive a hybrid automatic repeat request (HARQ) response (e.g., for a physical sidelink shared channel (PSSCH) that was transmitted earlier by the UE to another UE). The UE may also need to keep silence over a gap symbol, to avoid blocking a LBT from other UEs for a PSFCH transmission, even though the gap is not long enough for a Type 1 LBT (e.g., when a subcarrier spacing (SCS) is equal to 30 kHz for channel access priority class (CAPC) is equal to 1, distributed inter frame space (DIFS) is equal to 34 us, contention window minimum (CWmin) is equal to 27 us, and contention window maximum (CWmax) is equal to 63 us)).

Figure 7:
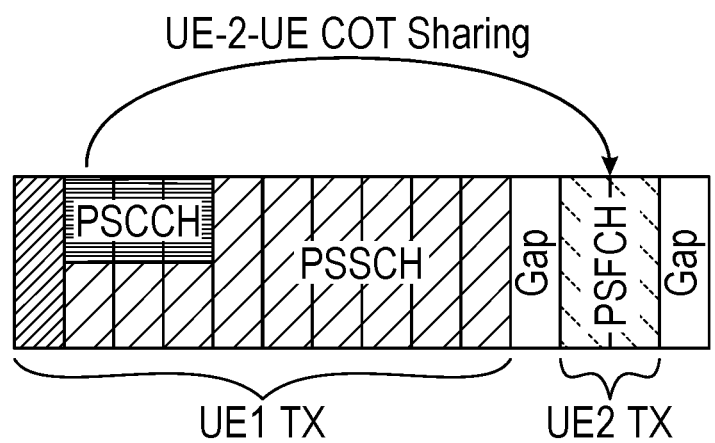
FIG. 7 depicts example UE-to-UE channel occupancy time (COT) sharing.

In some cases, there are multiple procedures to suppress a LBT uncertainty for a PSFCH. In one example (e.g., as illustrated in FIG. 7), a framework of UE-to-UE COT sharing is leveraged to smooth a LBT procedure for a PSFCH. However, it is still not clear how far the UE-2-UE COT sharing (e.g., not supported in NR-U) can operate. Furthermore, the COT propagation (i.e., UE2 re-sharing the COT back to UE1) may be needed to facilitate continuous transmission within the COT.

Figure 8:
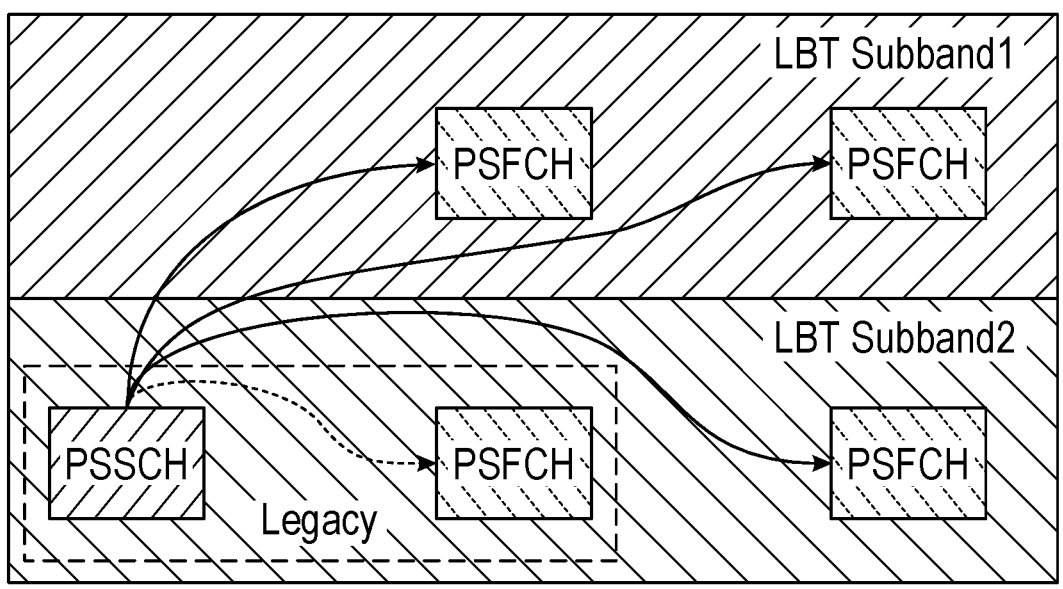
FIG. 8 depicts example listen before talk (LBT) on a PSFCH suppressed via multiple opportunities for a hybrid automatic repeat request (HARQ) response.

In another example (e.g., as illustrated in FIG. 8), a LBT uncertainty on a PSFCH is suppressed via introducing multiple opportunities for a HARQ response. For example, multiple time-domain and/or frequency-domain opportunities are used to suppress the LBT uncertainty for the PSFCH. However, there is an overhead due to the multiple opportunities (e.g., when an interlaced waveform is used for the PSFCH).

Figure 9:
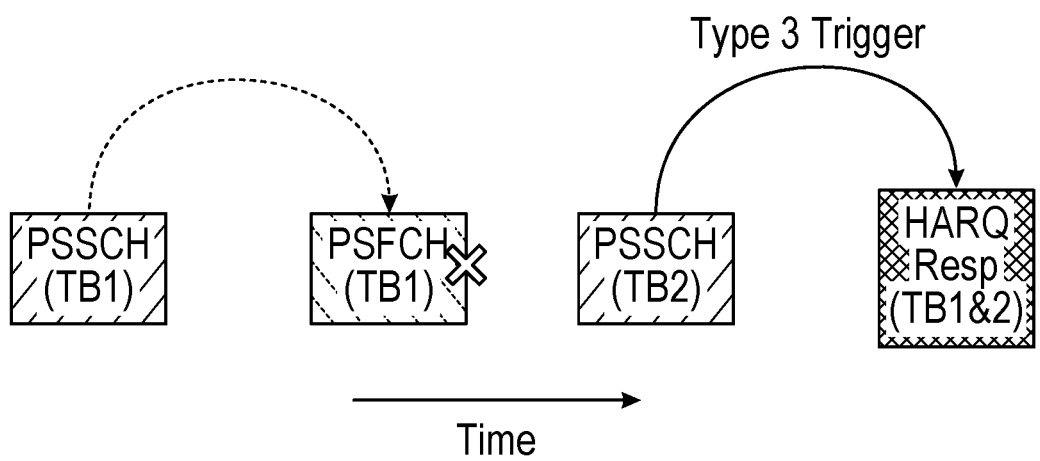
FIG. 9 depicts example trigger by a transmitter UE requesting a receiver UE to report HARQ responses with respect to all sidelink process IDs.

In another example, a type 3 HARQ codebook is provided (e.g., by NR-U for sidelink) to suppress a LBT uncertainty for a PSFCH. As illustrated in FIG. 9, a transmitter UE carries a trigger requesting a receiver UE to report HARQ responses with respect to all sidelink process IDs. The type 3 HARQ codebook is transmitted either by an enhanced/multi-bit PSFCH (e.g., based on a physical uplink control channel (PUCCH) format 2) or in a sidelink control information (SCI).

Figure 10:
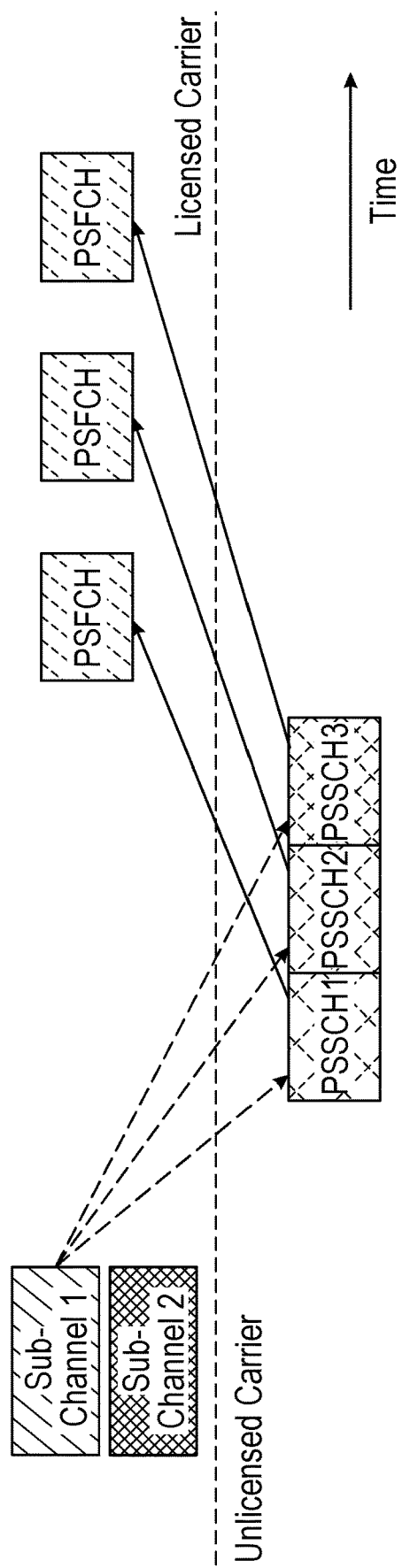
FIG. 10 depicts example back-to-back transmission of PSSCHs by a transmitter UE over an unlicensed carrier after obtaining a COT.

In some cases, a carrier aggregation (CA) framework involving a licensed carrier and an unlicensed carrier is provided (e.g., as illustrated in FIG. 10), to use the licensed carrier as an anchor so that a HARQ response to a PSSCH over the unlicensed carrier can be sent over extended PSFCH resources arranged in the anchor carrier (e.g., in parallel to those for PSSCHs transmitted over the licensed carrier). Simultaneously, a transmitter UE is able to perform back-to-back transmission of the PSSCHs over the unlicensed carrier after obtaining a COT (e.g., either via self-type 1 LBT or via COT sharing).

Aspects Related to Out-Band Physical Sidelink Feedback Channel (PSFCH) Resources for Sidelink Unlicensed Spectrum Aspects of the present disclosure provide apparatuses, methods, processing systems, and computer-readable mediums for managing out-band physical sidelink feedback channel (PSFCH) resources for sidelink unlicensed spectrum.

As noted above, new radio (NR) sidelink has been used for vehicle-to-everything (V2X) communications over licensed bands. Recently, 3rd generation partnership project (3GPP) has supported the sidelink for other applications (other than the V2X). So far, efforts to use the sidelink for the other applications have been limited to the licensed bands, yet not every other application can access the licensed bands.

Techniques described herein provide improvements with respect to a hybrid automatic repeat request (HARQ) response for a sidelink deployment over a frequency range 1 (FR1) unlicensed band that is imposed with a listen before talk (LBT) based channel access. For example, the techniques described herein arrange a PSFCH-only resource pool in a licensed carrier and attach it to a regular resource pool configured in an unlicensed carrier requiring a LBT. When the PSFCH-only resource pool is attached to the regular resource pool, an out-band resource in the PSFCH-only resource pool can only be accessed (e.g., for a HARQ response) after receiving a sidelink control information (SCI) in the regular resource pool. The techniques described herein may result in a higher data rate and improved spectral efficiency.

The techniques for managing the out-band PSFCH resources for the sidelink unlicensed spectrum proposed herein may be understood with reference to the FIGS. 11-20.

Figure 11:
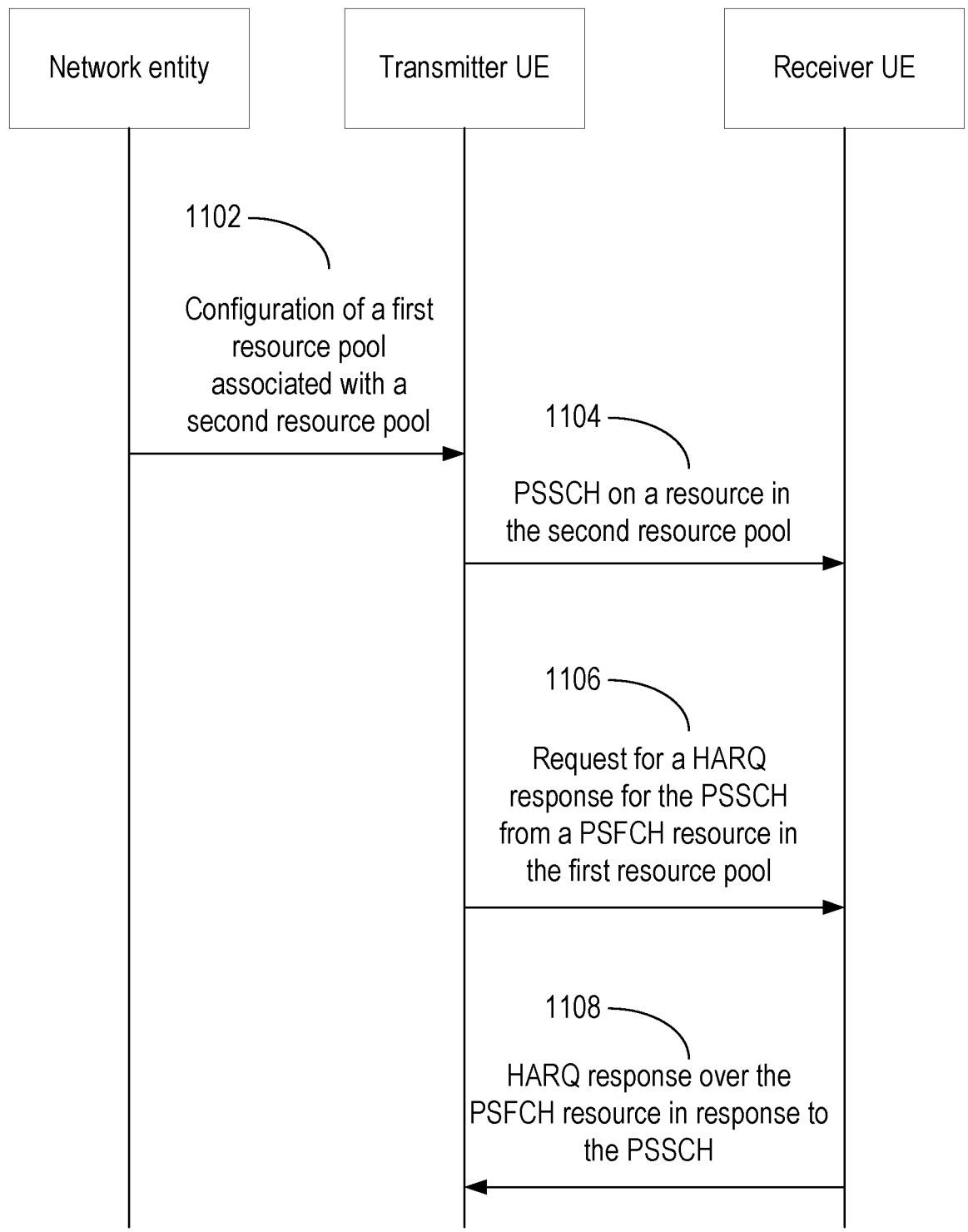
FIG. 11 depicts a call flow diagram illustrating example communication between a transmitter UE, a receiver UE, and a network entity.
Figure 12:
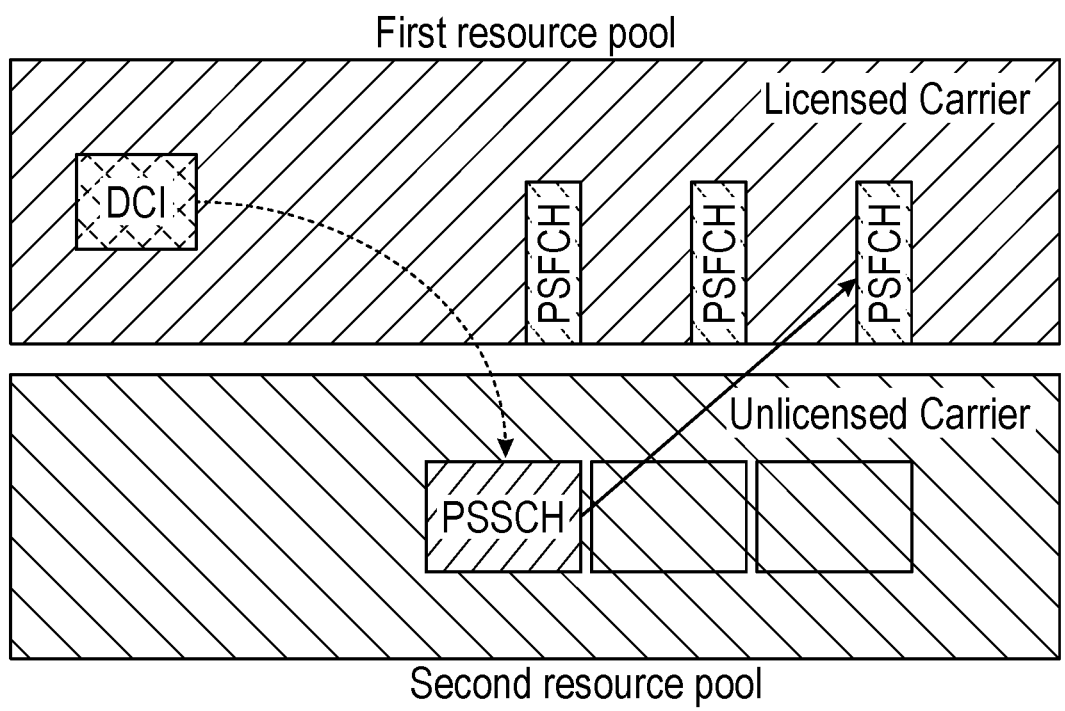
FIG. 12 depicts example a first resource pool (e.g., PSFCH-only resource pool) in a licensed carrier attached to a second resource pool configured in an unlicensed carrier requiring a LBT.

As illustrated in FIG. 11, at 1102, a network entity transmits a configuration of a first resource pool associated with (or attached to) a second resource pool to a transmitter UE (e.g., a UE that transmits information to another UE that receives the information). The first resource pool includes PSFCH resources for HARQ responses for physical sidelink shared channel (PSSCH) transmissions in the second resource pool. In other words, the PSFCH-only resource pool includes out-band resources for a HARQ response with respect to a PSSCH transmitted in the second resource pool. As illustrated in FIG. 12, the first resource pool is configured in a licensed carrier and the second resource pool is configured in an unlicensed carrier imposed with a LBT.

Referring back to FIG. 11, at 1104, the transmitter UE transmits a PSSCH on a resource in the second resource pool to a receiver UE (e.g., a UE that receives information transmitted by another UE).

At 1106, the transmitter UE transmits a request (e.g., for a HARQ response for the PSSCH from a PSFCH resource in the first resource pool) to the receiver UE.

At 1108, the receiver UE transmits the HARQ response (e.g., over the PSFCH resource in response to the PSSCH) to the transmitter UE.

In certain aspects, the PSSCH is transmitted over a subchannel in the second resource pool and the HARQ response is received over the PSFCH resource corresponding to the subchannel (i.e., the transmitter UE can request the HARQ response from one PSFCH resource in the first resource pool when transmitting over a subchannel in the second resource pool).

In certain aspects, the transmitter UE may operate in either Mode 1 or Mode 2 resource allocation. In some cases, the receiver UE (e.g., after receiving a SCI with the request from the transmitter UE) sends a response over the PSFCH resource(s) corresponding to the subchannel(s) occupied by the SCI.

Figure 13:
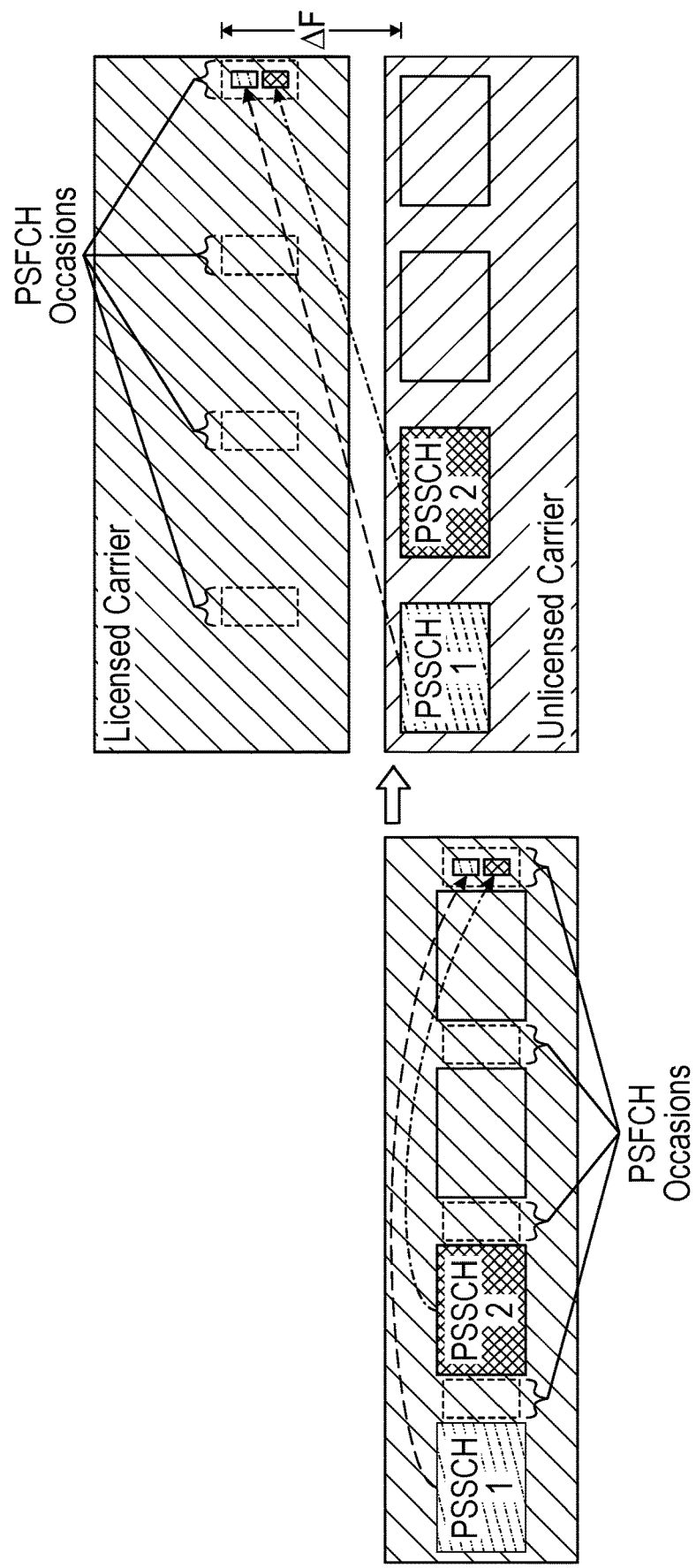
FIG. 13 depicts example one-to-one mapping from a subchannel in a second resource pool to a resource in a first resource pool.

In certain aspects, the first resource pool provides one PSFCH resource for each subchannel in the second resource pool (i.e., one-to-one mapping). In certain aspects, a mapping from a subchannel in the second resource pool to a resource in the first resource pool is indicated via a frequency offset (e.g., $\Delta F$ as illustrated in FIG. 13), when the first resource pool and the second resource pool have a same subcarrier spacing (SCS). In other words, when the two resource pools have the same SCS, the mapping from the subchannel in the second resource pool to the resource in the first resource pool may be indicated via the frequency offset on top of a legacy mapping. In one example, a presence of the first resource pool is indicated with a non-zero value of the frequency offset. In another example, the frequency offset is carried in a system information block (SIB12), a pre-configuration, and in a physical sidelink broadcast channel (PSBCH) to facilitate as a resource pool wise semi-static configuration.

Figure 14:
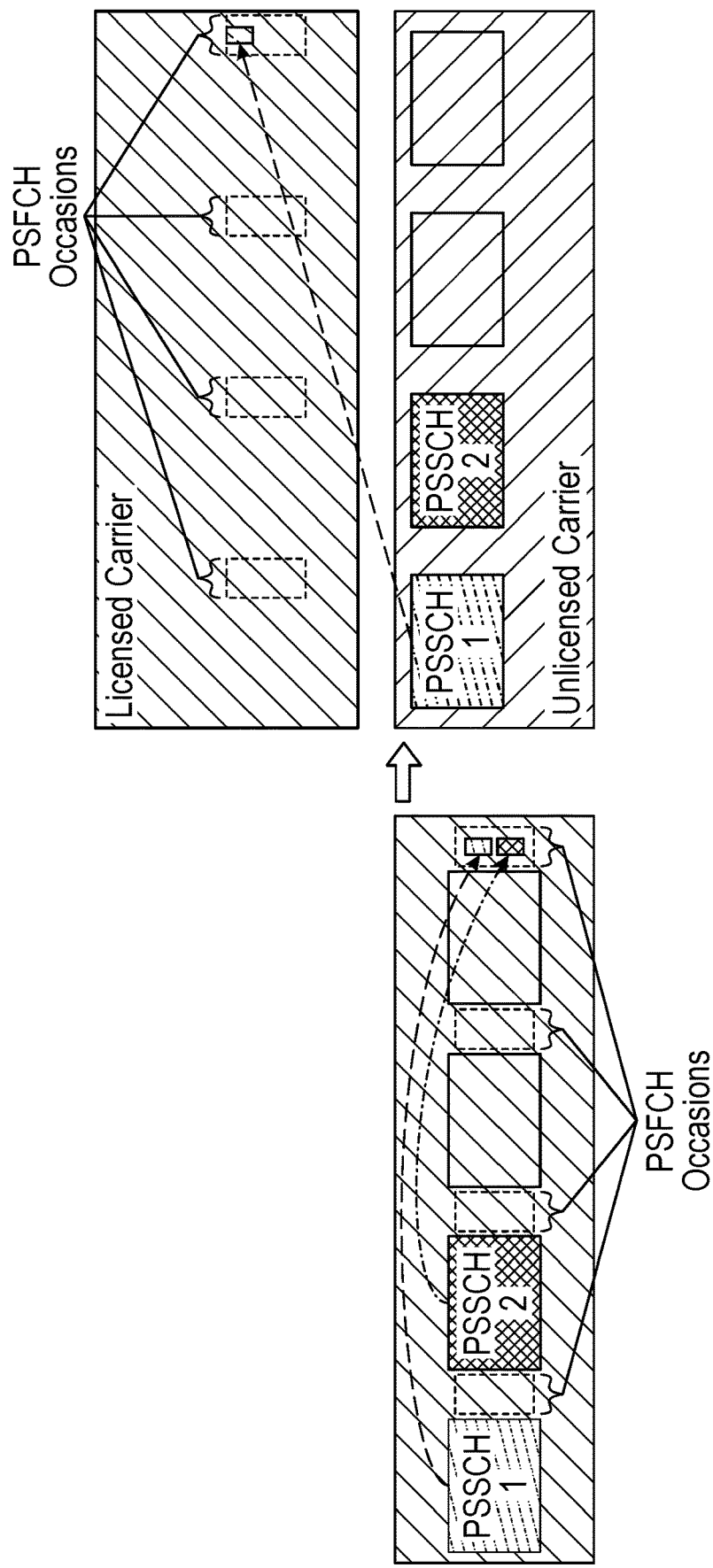
FIG. 14 depicts example sub-pools in a second resource pool.

In certain aspects, the first resource pool is configured to provide a one-to-one mapping for a subset of subchannels in the second resource pool. For example, as illustrated in FIG. 14 for use cases with a concern on resources on out-band HARQ response, the first resource pool is configured to provide the one-to-one mapping only for a subset of subchannels in the second resource pool. That is, the second resource pool is portioned, with one subpool being configured with PSFCH resources in the first resource pool. This can be used for either Mode 1 or Mode 2 resource allocation. In some cases, for Mode 2, channel busy ratio (CBR) and channel occupancy ratio (CR) are arranged for subpools to avoid over-hot competition towards a subpool with the out-band PSFCH resources.

In certain aspects, a many-to-one mapping is provided from subchannels in the second resource pool to PSFCH resources in the first resource pool. The many-to-one mapping is used in Mode 1 where access to the first resource pool is gated by the network entity.

Figure 15:
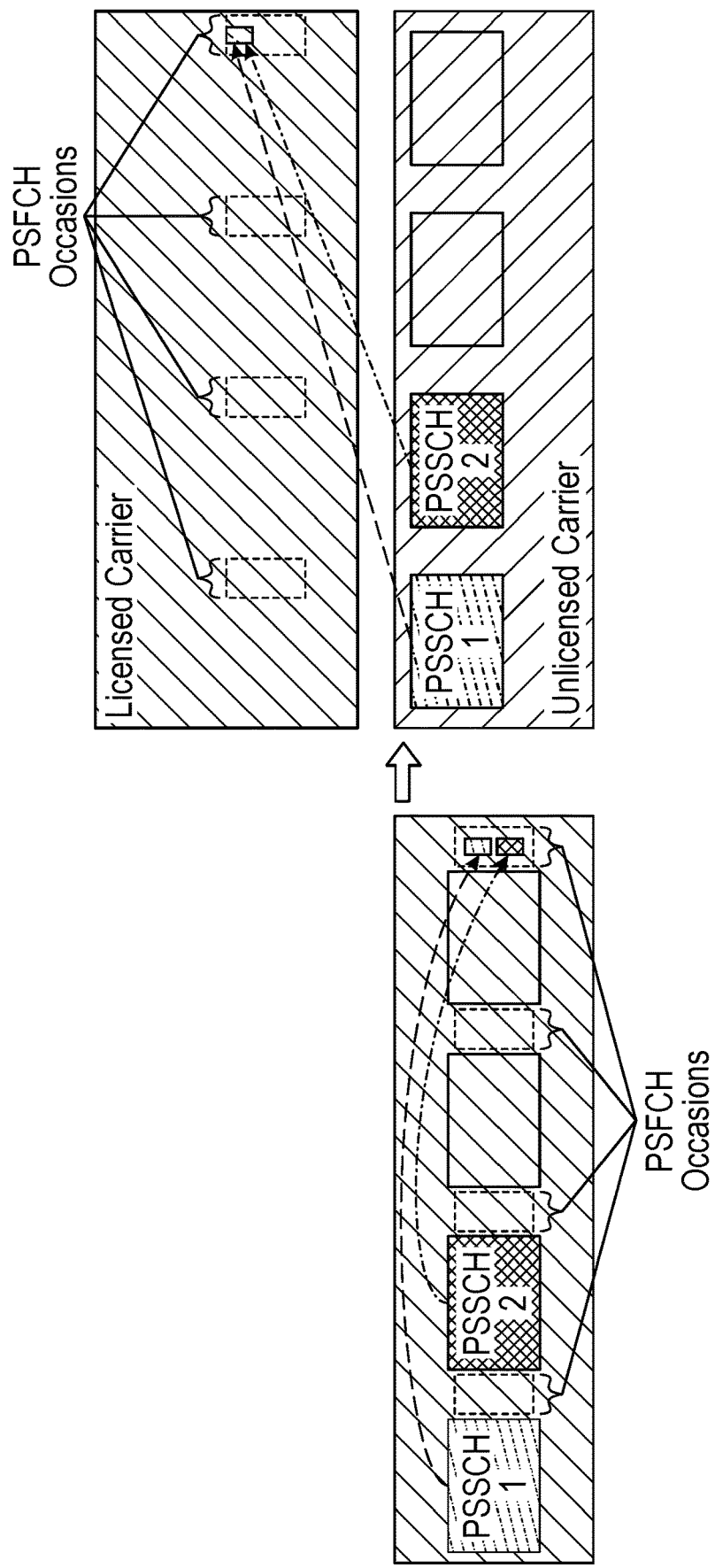
FIG. 15 depicts example many-to-one mapping from subchannels in a second resource pool to resources in a first resource pool.

In certain aspects, the first resource pool is configured via a radio resource control (RRC) signaling to a set of UEs including the transmitter UE and the receiver UE (e.g., with a high priority traffic). In some cases, as illustrated in FIG. 15, allocation of PSSCH1 and PSSCH2 is avoided to UEs that may access the first resource pool at a same instant. In such cases, the network entity grant includes an indication indicating whether a HARQ response or a PSFCH over the first resource pool is allowed.

Figure 16:
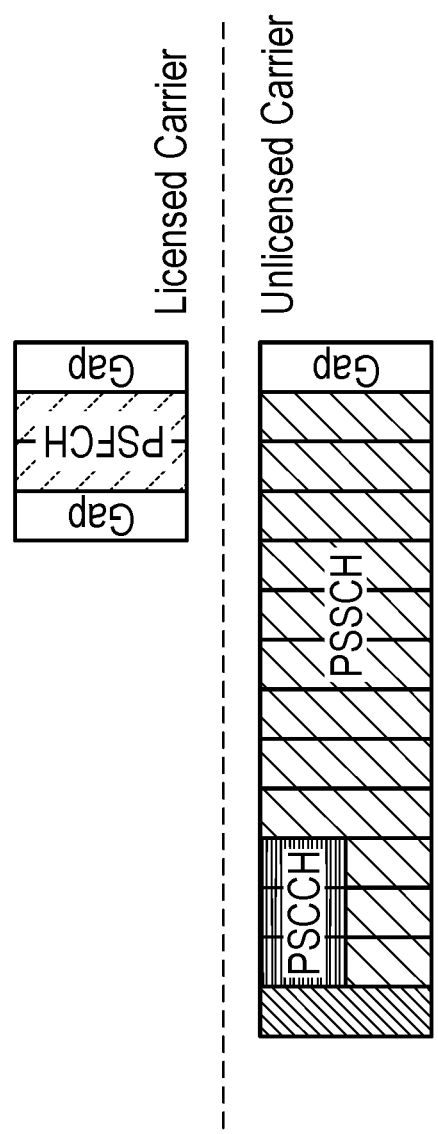
FIG. 16 depicts example PSFCH resources for a second resource pool.

In certain aspects, the transmitter UE receives an indication indicating the HARQ response is supported in the second resource pool via a one-to-one mapped first resource pool. In other words, there are no time divisional multiplexed (TDMed) PSFCH occasions in the second resource pool. Accordingly, as illustrated in FIG. 16, continuous transmissions within a channel occupancy time (COT) are facilitated more easily via only addressing a last gap symbol.

In certain aspects, the transmitter UE receives an indication (e.g., via the RRC signaling) indicating to utilize the first resource pool to support the HARQ response in the second resource pool that does not provide TDMed PSFCH resources. That is, the HARQ response is opportunistically supported between paired UEs that have received the dedicated RRC (e.g., directly or being forwarded from one UE to another UE upon the network entity configuration) for carrying the high priority traffic. In some cases, without intra-resource pool TDMed PSFCH resources, back-to-back transmissions are supported via addressing the slot-end gap symbol.

In certain aspects, the transmitter UE receives an indication indicating the second resource pool supports the HARQ response via both in-band PSFCH occasions and the first resource pool in parallel. This may be applicable when the first resource pool is arranged with many-to-one mapping to support UEs carrying a high priority traffic and with moderate resource allocation in the licensed spectrum.

Figure 17:
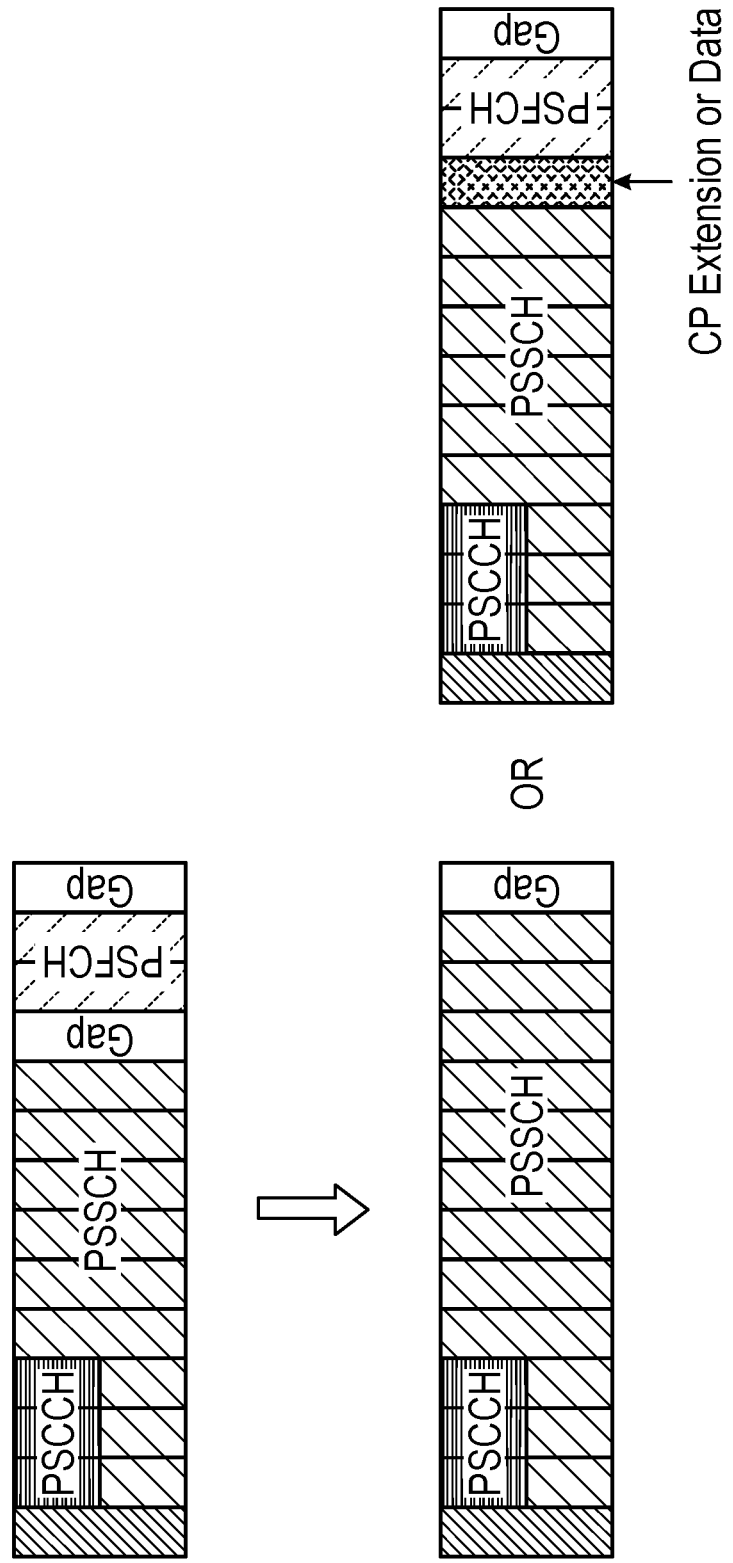
FIG. 17 depicts example parallel PSFCH resources for a second resource pool.

In some cases, the network entity has a larger probability to have a slot, which does not require a LBT gap for a PSFCH (e.g., when UEs having the HARQ response due at this slot can use the first resource pool). Otherwise, the LBT gap for the PSFCH is safely ignored when the network entity has not granted resources to PSSCHs whose HARQ response is due at this slot. In some cases, as illustrated in FIG. 17, the network entity grants the transmitter UE to transmit from bottom-right slots (instead of slots in bottom-left) to facilitate continuous transmissions in a COT. The transmitter UE inserts a codepoint in a SCI to indicate a new rate matching used in this slot.

Figure 18B:
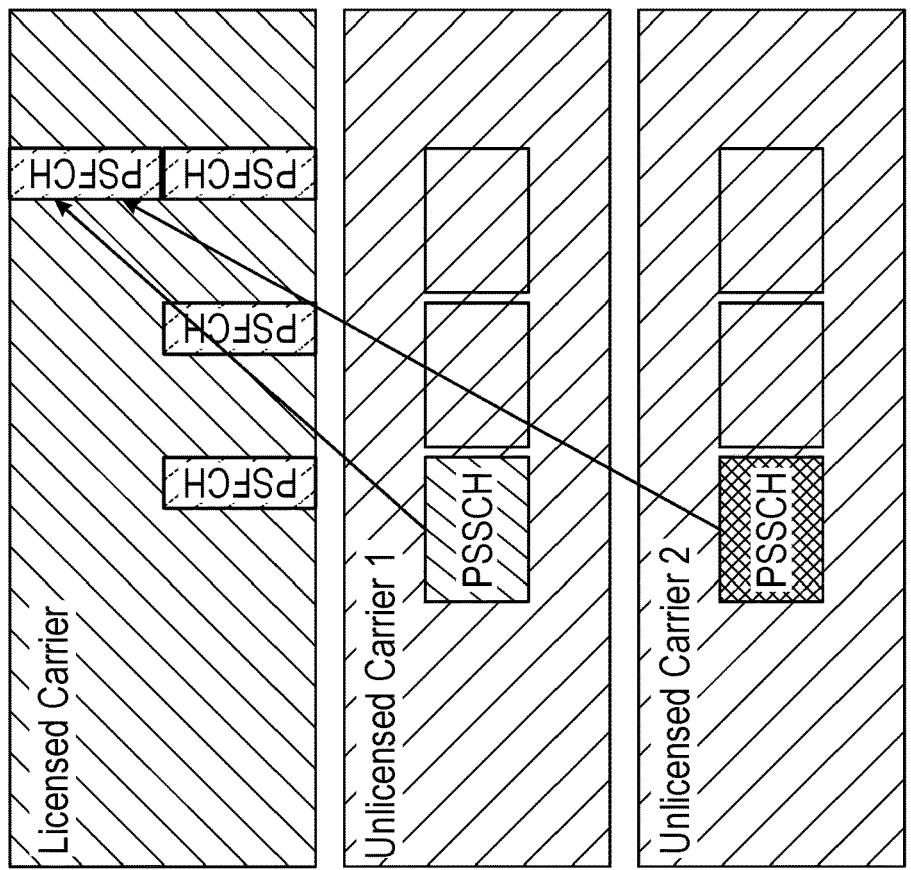
FIG. 18B depicts example first resource pool attached to non-orthogonal resources of multiple second resource pools.
Figure 18A:
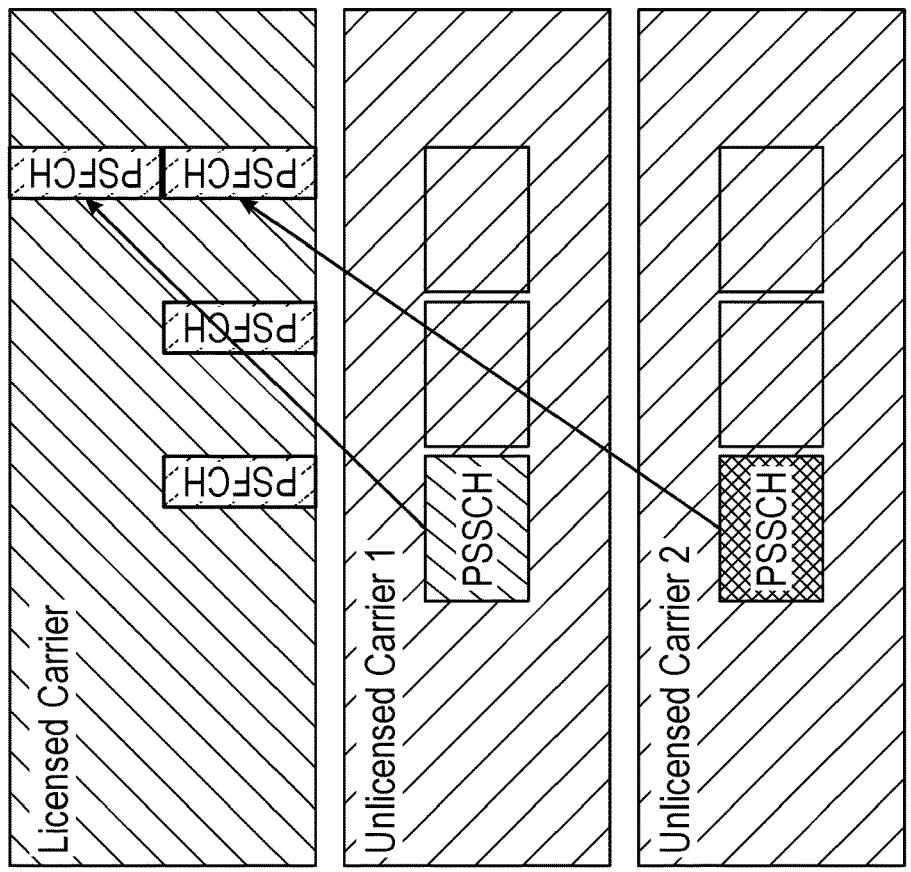
FIG. 18A depicts example first resource pool attached to orthogonal resources of multiple second resource pools.

In certain aspects, the first resource pool is associated with multiple second resource pools. In one example, as illustrated in FIG. 18A, the first resource pool is associated with orthogonal resources for the multiple second resource pools. In another example, as illustrated in FIG. 18B, the first resource pool is associated with non-orthogonal resources for the multiple second resource pools (e.g., to be used in Mode 1 resource allocation).

In certain aspects, a Zadoff-Chu (ZC) sequence based waveform is provided together with a PSFCH transmission carrying the HARQ response over the first resource pool. For example, to ease implementation in some cases (e.g., Mode 1 operation supported by a Uu radio and Mode 2 based PC5 radio), the ZC sequence based waveform is provided together with a comb structure for the PSFCH transmission over the first resource pool. In some cases, a conventional PSFCH may use a length-12 computer generate sequence (CGS) that is generated for PUCCH format 0, and a conventional PSFCH may facilitate per resource block (RB) frequency division multiplexing (FDM).

In certain aspects, the first resource pool is associated with a band allowing other than a load based equipment (LBE) based channel access (e.g., in some unlicensed deployment scenarios). In some cases, the LBE is a dominating channel access in 5G/6G unlicensed spectrum adopted by Wi-Fi, licensed assisted access (LAA), and/or NR-U. In some cases, the LBE is provided in the NR-U for a controllable environment. In some cases, a frequency hopping (FH) based channel access is provided in 2.4 GHz and 6 GHz band. In some cases, it may be helpful to put the first resource pool in a band specified with different from the LBE channel access. In some cases, there is less LBT uncertainty with either the LBE or the FH based channel access (e.g., possibly at cost of more collisions). In addition, at the same time, continuous transmissions of the PSSCH are provided to exploit potentials provided by the LBE based channel access.

Example Operations of a Transmitter UE

FIG. 19 illustrates example operations 1900 for wireless communication. The operations 1900 may be performed, for example, by a transmitter user equipment (UE) (e.g., such as UE 104 in wireless communication network 100 of FIG. 1). The operations 1900 may be implemented as software components that are executed and run on one or more processors (e.g., controller/processor 380 of FIG. 3). Further, transmission and reception of signals by the transmitter UE in the operations 1900 may be enabled, for example, by one or more antennas (e.g., antennas 352 of FIG. 3). In certain aspects, the transmission and/or reception of signals by the transmitter UE may be implemented via a bus interface of one or more processors (e.g., the controller/processor 380) obtaining and/or outputting signals.

The operations 1900 begin, at 1910, by receiving from a network entity a configuration of a first resource pool associated with a second resource pool. The first resource pool includes physical sidelink feedback channel (PSFCH) resources for hybrid automatic repeat request (HARQ) responses for physical sidelink shared channel (PSSCH) transmissions in the second resource pool. For example, the transmitter UE may receive the configuration, using antenna(s) and/or receiver/transceiver components of UE 104 shown in FIG. 1 or FIG. 3 and/or of the apparatus shown in FIG. 21.

At 1920, the transmitter UE transmits to the receiver UE a PSSCH on a resource in the second resource pool. For example, the transmitter UE may transmit the PSSCH, using antenna(s) and/or transmitter/transceiver components of UE 104 shown in FIG. 1 or FIG. 3 and/or of the apparatus shown in FIG. 21.

At 1930, the transmitter UE transmits to the receiver UE a request for a HARQ response for the PSSCH from a PSFCH resource in the first resource pool. For example, the transmitter UE may transmit the request, using antenna(s) and/or transmitter/transceiver components of UE 104 shown in FIG. 1 or FIG. 3 and/or of the apparatus shown in FIG. 21.

At 1940, the transmitter UE receives from the receiver UE the HARQ response over the PSFCH resource in response to the PSSCH. For example, the transmitter UE may receive the HARQ response, using antenna(s) and/or receiver/transceiver components of UE 104 shown in FIG. 1 or FIG. 3 and/or of the apparatus shown in FIG. 21.

Note that FIG. 19 is just one example of a method, and other methods including fewer, additional, or alternative steps are possible consistent with this disclosure.

Example Operations of a Receiver UE

FIG. 20 illustrates example operations 2000 for wireless communication. The operations 1800 may be performed, for example, by a receiver user equipment (UE) (e.g., such as UE 104 in wireless communication network 100 of FIG. 1). The operations 2000 may be implemented as software components that are executed and run on one or more processors (e.g., controller/processor 380 of FIG. 3). Further, transmission and reception of signals by the receiver UE in the operations 2000 may be enabled, for example, by one or more antennas (e.g., antennas 352 of FIG. 3). In certain aspects, the transmission and/or reception of signals by the receiver UE may be implemented via a bus interface of one or more processors (e.g., the controller/processor 380) obtaining and/or outputting signals.

The operations 2000 begin, at 2010, by receiving a physical sidelink shared channel (PSSCH) on a resource in a second resource pool from a transmitter UE configured with a configuration of a first resource pool associated with the second resource pool. The first resource pool includes physical sidelink feedback channel (PSFCH) resources for hybrid automatic repeat request (HARQ) responses for PSSCH transmissions in the second resource pool. For example, the receiver UE may receive the PSSCH, using antenna(s) and/or receiver/transceiver components of UE 104 shown in FIG. 1 or FIG. 3 and/or of the apparatus shown in FIG. 22.

At 2020, the receiver UE receives from the transmitter UE a request for a HARQ response for the PSSCH from a PSFCH resource in the first resource pool. For example, the receiver UE may receive the request, using antenna(s) and/or receiver/transceiver components of UE 104 shown in FIG. 1 or FIG. 3 and/or of the apparatus shown in FIG. 22.

At 2030, the receiver UE transmits to the transmitter UE the HARQ response over the PSFCH resource in response to the PSSCH. For example, the receiver UE may transmit the HARQ response, using antenna(s) and/or transmitter/transceiver components of UE 104 shown in FIG. 1 or FIG. 3 and/or of the apparatus shown in FIG. 22.

Note that FIG. 20 is just one example of a method, and other methods including fewer, additional, or alternative steps are possible consistent with this disclosure.

Example Communications Devices

Figure 21:
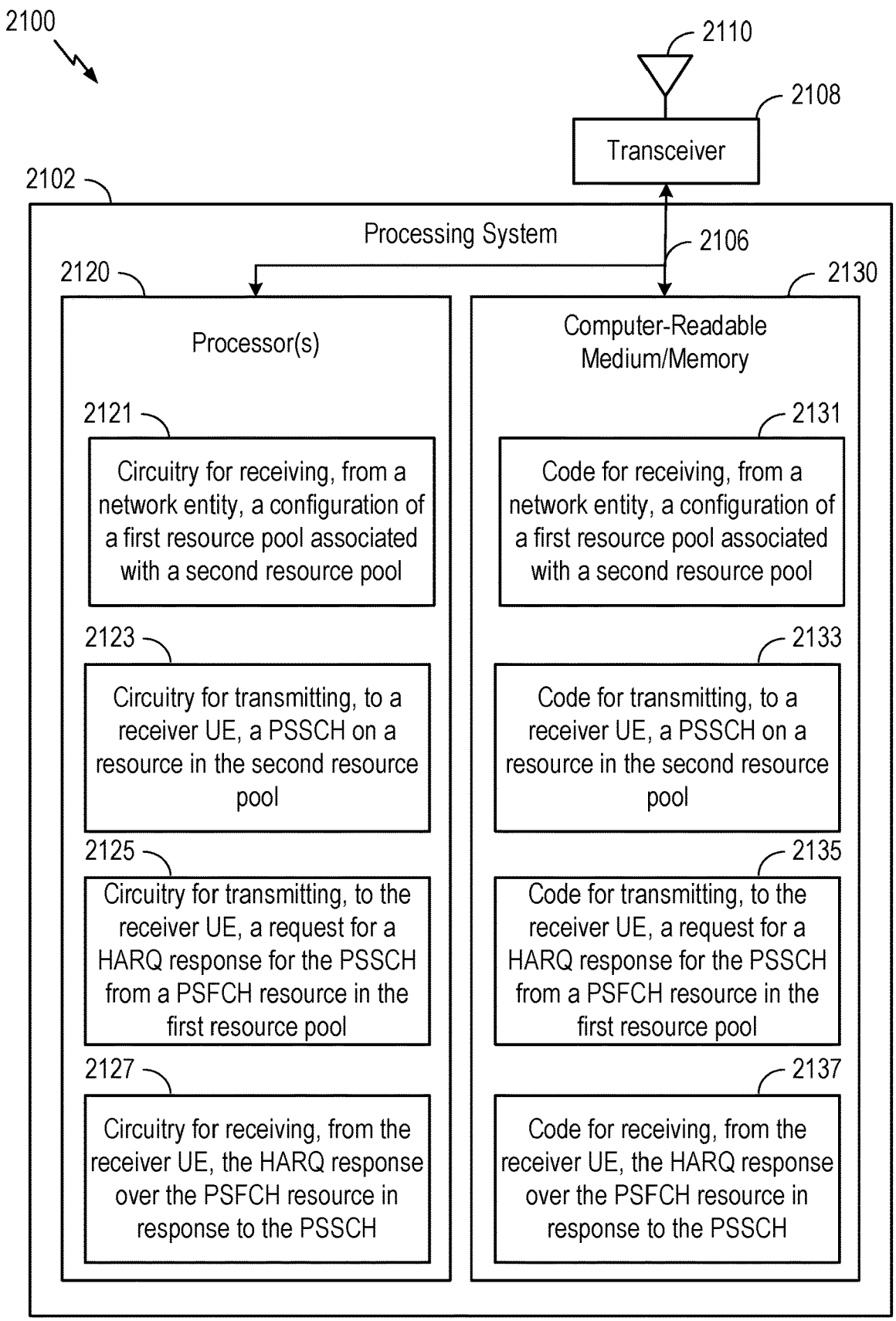
FIG. 21 depicts aspects of an example communications device.

FIG. 21 depicts aspects of an example communications device 2100. In some aspects, communications device 2100 is a transmitter user equipment (UE), such as UE 104 described above with respect to FIGS. 1 and 3.

The communications device 2100 includes a processing system 2102 coupled to a transceiver 2108 (e.g., a transmitter and/or a receiver). The transceiver 2108 is configured to transmit and receive signals for the communications device 2100 via an antenna 2110, such as the various signals as described herein. The processing system 2102 may be configured to perform processing functions for the communications device 2100, including processing signals received and/or to be transmitted by the communications device 2100.

The processing system 2102 includes one or more processors 2120. In various aspects, the one or more processors 2120 may be representative of one or more of receive processor 358, transmit processor 364, TX MIMO processor 366, and/or controller/processor 380, as described with respect to FIG. 3. The one or more processors 2120 are coupled to a computer-readable medium/memory 2130 via a bus 2106. In certain aspects, the computer-readable medium/memory 2130 is configured to store instructions (e.g., computer-executable code) that when executed by the one or more processors 2120, cause the one or more processors 2120 to perform the operations 1900 described with respect to FIG. 19, or any aspect related to it. Note that reference to a processor performing a function of communications device 2100 may include one or more processors performing that function of communications device 2100.

In the depicted example, computer-readable medium/memory 2130 stores code (e.g., executable instructions) for receiving 2131 comprising code for receiving from a network entity a configuration of a first resource pool associated with a second resource pool where the first resource pool comprises physical sidelink feedback channel (PSFCH) resources for hybrid automatic repeat request (HARQ) responses for physical sidelink shared channel (PSSCH) transmissions in the second resource pool, code for transmitting 2133 comprising code for transmitting to a receiver UE a PSSCH on a resource in the second resource pool, code for transmitting 2135 comprising code for transmitting to the receiver UE a request for a HARQ response for the PSSCH from a PSFCH resource in the first resource pool, and code for receiving 2137 comprising code for receiving from the receiver UE the HARQ response over the PSFCH resource in response to the PSSCH. Processing of the code 2131-2137 may cause the communications device 2100 to perform the operations 1900 described with respect to FIG. 19, or any aspect related to it.

The one or more processors 2120 include circuitry configured to implement (e.g., execute) the code stored in the computer-readable medium/memory 2130, including circuitry for receiving 2121 comprising circuitry for receiving from a network entity a configuration of a first resource pool associated with a second resource pool where the first resource pool comprises PSFCH resources for HARQ responses for PSSCH transmissions in the second resource pool, circuitry for transmitting 2123 comprising circuitry for transmitting to a receiver UE a PSSCH on a resource in the second resource pool, circuitry for transmitting 2125 comprising circuitry for transmitting to the receiver UE a request for a HARQ response for the PSSCH from a PSFCH resource in the first resource pool, and circuitry for receiving 2127 comprising circuitry for receiving from the receiver UE the HARQ response over the PSFCH resource in response to the PSSCH. Processing with circuitry 2121-2127 may cause the communications device 2100 to perform the operations 1900 described with respect to FIG. 19, or any aspect related to it.

Various components of the communications device 2100 may provide means for performing the operations 1900 described with respect to FIG. 19, or any aspect related to it. For example, means for transmitting, sending or outputting for transmission may include the transceivers 354 and/or antenna(s) 352 of the UE 104 illustrated in FIG. 3 and/or transceiver 2108 and antenna 2110 of the communications device 2100 in FIG. 21. Means for receiving or obtaining may include the transceivers 354 and/or antenna(s) 352 of the UE 104 illustrated in FIG. 3 and/or transceiver 2108 and antenna 2110 of the communications device 2100 in FIG. 21.

Figure 22:
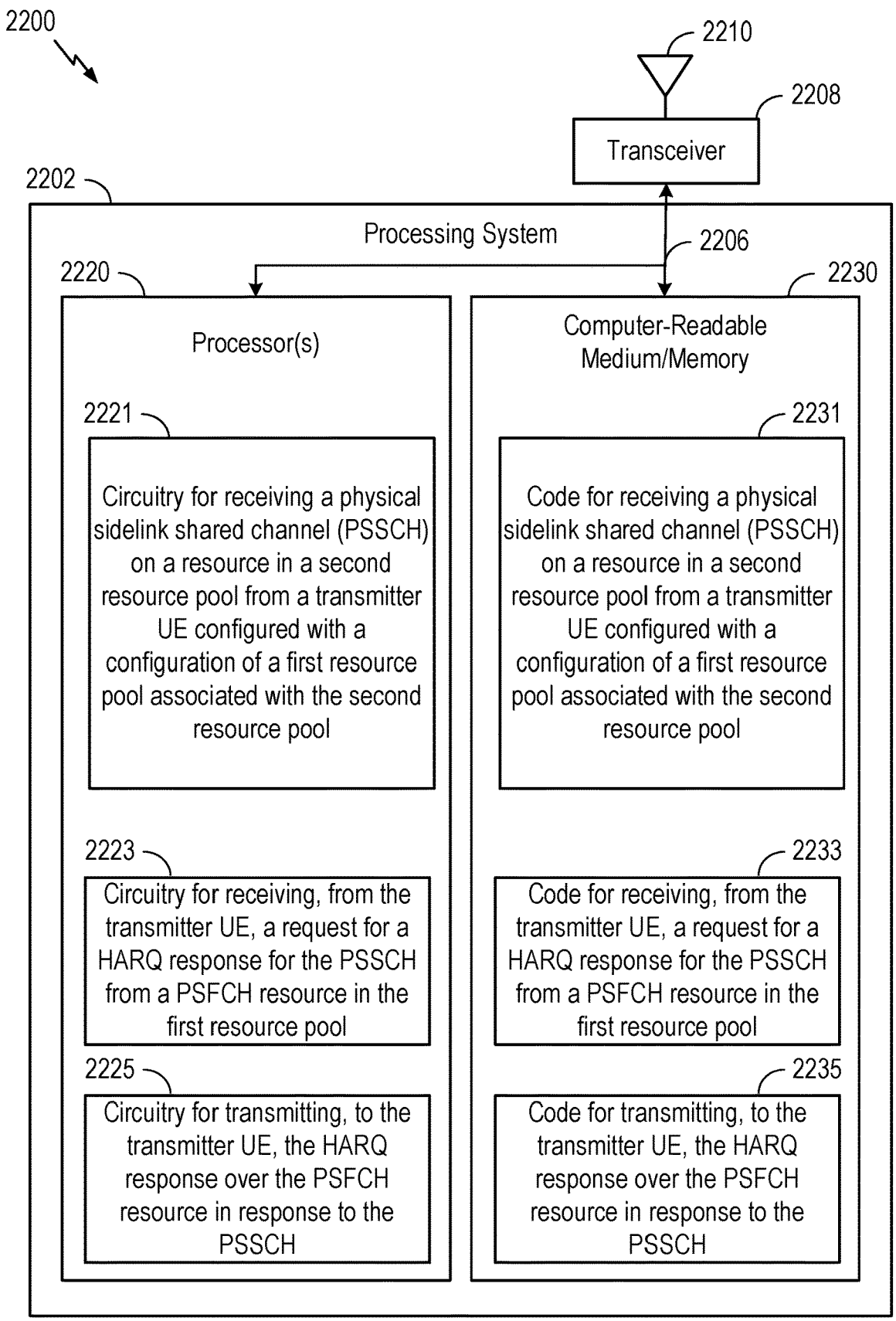
FIG. 22 depicts aspects of an example communications device.

FIG. 22 depicts aspects of an example communications device 2200. In some aspects, communications device 2200 is a receiver UE, such as UE 104 described above with respect to FIGS. 1 and 3.

The communications device 2200 includes a processing system 2202 coupled to a transceiver 2208 (e.g., a transmitter and/or a receiver). The transceiver 2208 is configured to transmit and receive signals for the communications device 2200 via an antenna 2210, such as the various signals as described herein. The processing system 2202 may be configured to perform processing functions for the communications device 2200, including processing signals received and/or to be transmitted by the communications device 2200.

The processing system 2202 includes one or more processors 2220. In various aspects, the one or more processors 2220 may be representative of one or more of receive processor 358, transmit processor 364, TX MIMO processor 366, and/or controller/processor 380, as described with respect to FIG. 3. The one or more processors 2220 are coupled to a computer-readable medium/memory 2230 via a bus 2206. In certain aspects, the computer-readable medium/ memory 2230 is configured to store instructions (e.g., computer-executable code) that when executed by the one or more processors 2220, cause the one or more processors 2220 to perform the operations 2000 described with respect to FIG. 20, or any aspect related to it. Note that reference to a processor performing a function of communications device 2200 may include one or more processors performing that function of communications device 2200.

In the depicted example, computer-readable medium/memory 2230 stores code (e.g., executable instructions) for receiving 2231 comprising code for receiving a PSSCH on a resource in a second resource pool from a transmitter UE configured with a configuration of a first resource pool associated with the second resource pool where the first resource pool comprises PSFCH resources for HARQ responses for PSSCH transmissions in the second resource pool, code for receiving 2233 comprising code for receiving from the transmitter UE a request for a HARQ response for the PSSCH from a PSFCH resource in the first resource pool, and code for transmitting 2235 comprising code for transmitting to the transmitter UE the HARQ response over the PSFCH resource in response to the PSSCH. Processing of the code 2231-2235 may cause the communications device 2200 to perform the operations 2000 described with respect to FIG. 20, or any aspect related to it.

The one or more processors 2220 include circuitry configured to implement (e.g., execute) the code stored in the computer-readable medium/memory 2230, including circuitry for receiving 2221 comprising circuitry for receiving a PSSCH on a resource in a second resource pool from a transmitter UE configured with a configuration of a first resource pool associated with the second resource pool where the first resource pool comprises PSFCH resources for HARQ responses for PSSCH transmissions in the second resource pool, circuitry for receiving 2223 comprising circuitry for receiving from the transmitter UE a request for a HARQ response for the PSSCH from a PSFCH resource in the first resource pool, and circuitry for transmitting 2225 comprising circuitry for transmitting to the transmitter UE the HARQ response over the PSFCH resource in response to the PSSCH. Processing with circuitry 2221-2225 may cause the communications device 2200 to perform the operations 2000 described with respect to FIG. 20, or any aspect related to it.

Various components of the communications device 2200 may provide means for performing the operations 2000 described with respect to FIG. 20, or any aspect related to it. For example, means for transmitting, sending or outputting for transmission may include the transceivers 354 and/or antenna(s) 352 of the UE 104 illustrated in FIG. 3 and/or transceiver 2208 and antenna 2210 of the communications device 2200 in FIG. 22. Means for receiving or obtaining may include the transceivers 354 and/or antenna(s) 352 of the UE 104 illustrated in FIG. 3 and/or transceiver 2208 and antenna 2210 of the communications device 2200 in FIG. 22.

Example Clauses

Implementation examples are described in the following numbered clauses:

Clause 1: A method for wireless communications by a transmitter user equipment (UE), comprising: receiving, from a network entity, a configuration of a first resource pool associated with a second resource pool, wherein the first resource pool comprises physical sidelink feedback channel (PSFCH) resources for hybrid automatic repeat request (HARQ) responses for physical sidelink shared channel (PSSCH) transmissions in the second resource pool; transmitting, to a receiver UE, a PSSCH on a resource in the second resource pool; transmitting, to the receiver UE, a request for a HARQ response for the PSSCH from a PSFCH resource in the first resource pool; and receiving, from the receiver UE, the HARQ response over the PSFCH resource in response to the PSSCH.

Clause 2: The method alone or in combination with the first clause, wherein the first resource pool is configured in a licensed carrier and the second resource pool is configured in an unlicensed carrier.

Clause 3: The method alone or in combination with the first clause, wherein the PSSCH is transmitted over a subchannel in the second resource pool and the HARQ response is received over the PSFCH resource corresponding to the subchannel.

Clause 4: The method alone or in combination with the first clause, wherein the first resource pool provides one PSFCH resource for each subchannel in the second resource pool.

Clause 5: The method alone or in combination with the first clause, wherein a mapping from a subchannel in the second resource pool to a resource in the first resource pool is indicated via a frequency offset, when the first resource pool and the second resource pool have a same subcarrier spacing (SCS).

Clause 6: The method alone or in combination with the first clause, wherein the first resource pool is configured to provide a one-to-one mapping for a subset of subchannels in the second resource pool.

Clause 7: The method alone or in combination with the first clause, wherein a many-to-one mapping is provided from subchannels in the second resource pool to PSFCH resources in the first resource pool.

Clause 8: The method alone or in combination with the first clause, wherein the first resource pool is configured via a radio resource control (RRC) signaling to a set of UEs comprising the transmitter UE and the receiver UE.

Clause 9: The method alone or in combination with the first clause, further comprising receiving an indication indicating the HARQ response is supported in the second resource pool via a one-to-one mapped first resource pool.

Clause 10: The method alone or in combination with the first clause, further comprising receiving an indication, via a radio resource control (RRC) signaling, indicating to utilize the first resource pool to support the HARQ response in the second resource pool that does not provide time divisional multiplexed (TDMed) PSFCH resources.

Clause 11: The method alone or in combination with the first clause, further comprising receiving an indication indicating the second resource pool supports the HARQ response via PSFCH occasions and the first resource pool in parallel.

Clause 12: The method alone or in combination with the first clause, wherein the first resource pool is associated with multiple second resource pools.

Clause 13: The method alone or in combination with the first clause, wherein a Zadoff-Chu (ZC) sequence based waveform is specified together with a PSFCH transmission carrying the HARQ response over the first resource pool.

Clause 14: The method alone or in combination with the first clause, wherein the first resource pool is associated with a band allowing other than a load based equipment (LBE) based channel access.

Clause 15: A method for wireless communications by a receiver user equipment (UE), comprising: receiving a physical sidelink shared channel (PSSCH) on a resource in a second resource pool from a transmitter UE configured with a configuration of a first resource pool associated with the second resource pool, wherein the first resource pool comprises physical sidelink feedback channel (PSFCH) resources for hybrid automatic repeat request (HARQ) responses for PSSCH transmissions in the second resource pool; receiving, from the transmitter UE, a request for a HARQ response for the PSSCH from a PSFCH resource in the first resource pool; and transmitting, to the transmitter UE, the HARQ response over the PSFCH resource in response to the PSSCH.

Clause 16: The method alone or in combination with the fifteenth clause, wherein the first resource pool is configured in a licensed carrier and the second resource pool is configured in an unlicensed carrier.

Clause 17: The method alone or in combination with the fifteenth clause, wherein the PSSCH is transmitted over a subchannel in the second resource pool and the HARQ response is received over the PSFCH resource corresponding to the subchannel.

Clause 18: The method alone or in combination with the fifteenth clause, wherein the first resource pool provides one PSFCH resource for each subchannel in the second resource pool.

Clause 19: The method alone or in combination with the fifteenth clause, wherein a mapping from a subchannel in the second resource pool to a resource in the first resource pool is indicated via a frequency offset, when the first resource pool and the second resource pool have a same subcarrier spacing (SCS).

Clause 20: The method alone or in combination with the fifteenth clause, wherein the first resource pool is configured to provide a one-to-one mapping for a subset of subchannels in the second resource pool.

Clause 21: The method alone or in combination with the fifteenth clause, wherein a many-to-one mapping is provided from subchannels in the second resource pool to PSFCH resources in the first resource pool.

Clause 22: The method alone or in combination with the fifteenth clause, wherein the first resource pool is configured via a radio resource control (RRC) signaling to a set of UEs comprising the transmitter UE and the receiver UE.

Clause 23: The method alone or in combination with the fifteenth clause, further comprising transmitting an indication indicating the HARQ response is supported in the second resource pool via a one-to-one mapped first resource pool.

Clause 24: The method alone or in combination with the fifteenth clause, further comprising transmitting an indication, via a radio resource control (RRC) signaling, indicating to utilize the first resource pool to support the HARQ response in the second resource pool that does not provide time divisional multiplexed (TDMed) PSFCH resources.

Clause 25: The method alone or in combination with the fifteenth clause, further comprising transmitting an indication indicating the second resource pool supports the HARQ response via PSFCH occasions and the first resource pool in parallel.

Clause 26: The method alone or in combination with the fifteenth clause, wherein the first resource pool is associated with multiple second resource pools.

Clause 27: The method alone or in combination with the fifteenth clause, wherein a Zadoff-Chu (ZC) sequence based waveform is specified together with a PSFCH transmission carrying the HARQ response over the first resource pool.

Clause 28: The method alone or in combination with the fifteenth clause, wherein the first resource pool is associated with a band allowing other than a load based equipment (LBE) based channel access.

Clause 29: An apparatus, comprising: a memory comprising executable instructions; and a processor configured to execute the executable instructions and cause the apparatus to perform a method in accordance with any one of Clauses 1-28.

Clause 30: An apparatus, comprising means for performing a method in accordance with any one of Clauses 1-28.

Clause 31: A non-transitory computer-readable medium comprising executable instructions that, when executed by a processor of an apparatus, cause the apparatus to perform a method in accordance with any one of Clauses 1-28.

Clause 32: A computer program product embodied on a computer-readable storage medium comprising code for performing a method in accordance with any one of Clauses 1-28.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A transmitter user equipment (UE) configured for wireless communications, comprising:
    a memory comprising instructions; and
    one or more processors configured to execute the instructions and cause the transmitter UE to:
        receive, from a network entity, a configuration of a first resource pool associated with a second resource pool, wherein the first resource pool and the second resource pool are configured in different carriers, wherein the second resource pool comprises physical sidelink shared channel (PSSCH) resources for PSSCH transmissions and the first resource pool comprises physical sidelink feedback channel (PSFCH) resources for hybrid automatic repeat request (HARQ) responses for the PSSCH transmissions in the second resource pool;
        transmit, to a receiver UE, a PSSCH on a PSSCH resource in the second resource pool;
        transmit, to the receiver UE, a request for a HARQ response for the PSSCH from a PSFCH resource in the first resource pool; and
        receive, from the receiver UE, the HARQ response over the PSFCH resource in response to the PSSCH.

2. The transmitter UE of claim 1, wherein the first resource pool is configured in a licensed carrier and the second resource pool is configured in an unlicensed carrier.

3. The transmitter UE of claim 1, wherein the PSSCH is transmitted over a subchannel in the second resource pool and the HARQ response is received over the PSFCH resource corresponding to the subchannel.

4. The transmitter UE of claim 1, wherein the first resource pool provides one PSFCH resource for each subchannel in the second resource pool.

5. The transmitter UE of claim 1, wherein a mapping from a subchannel in the second resource pool to a PSFCH resource in the first resource pool is indicated via a frequency offset, when the first resource pool and the second resource pool have a same subcarrier spacing (SCS).

6. The transmitter UE of claim 1, wherein the first resource pool is configured to provide a one-to-one mapping for a subset of subchannels in the second resource pool.

7. The transmitter UE of claim 1, wherein a many-to-one mapping is provided from subchannels in the second resource pool to the PSFCH resources in the first resource pool.

8. The transmitter UE of claim 1, wherein the first resource pool is configured via a radio resource control (RRC) signaling to a set of UEs comprising the transmitter UE and the receiver UE.

9. The transmitter UE of claim 1, wherein the one or more processors are further configured to execute the instructions and cause the transmitter UE to receive an indication indicating the HARQ response is supported in the second resource pool via a one-to-one mapped first resource pool.

10. The transmitter UE of claim 1, wherein one or more processors are further configured to execute the instructions and cause the transmitter UE to receive an indication, via a radio resource control (RRC) signaling, indicating to utilize the first resource pool to support the HARQ response in the second resource pool that does not provide time divisional multiplexed (TDMed) PSFCH resources.

11. The transmitter UE of claim 1, wherein the one or more processors are further configured to execute the instructions and cause the transmitter UE to receive an indication indicating the second resource pool supports the HARQ response via PSFCH occasions and the first resource pool in parallel.

12. The transmitter UE of claim 1, wherein the first resource pool is associated with multiple second resource pools.

13. The transmitter UE of claim 1, wherein a Zadoff-Chu (ZC) sequence based waveform is specified together with a PSFCH transmission carrying the HARQ response over the first resource pool.

14. The transmitter UE of claim 1, wherein the first resource pool is associated with a band allowing other than a load based equipment (LBE) based channel access.

15. A receiver user equipment (UE) configured for wireless communications, comprising:
    a memory comprising instructions; and
    one or more processors configured to execute the instructions and cause the receiver UE to:
        receive a physical sidelink shared channel (PSSCH) on a PSSCH resource in a second resource pool from a transmitter UE configured with a configuration of a first resource pool associated with the second resource pool, wherein the first resource pool and the second resource pool are configured in different carriers, wherein the second resource pool comprises PSSCH resources for PSSCH transmissions and the first resource pool comprises physical sidelink feedback channel (PSFCH) resources for hybrid automatic repeat request (HARQ) responses for the PSSCH transmissions in the second resource pool;

receive, from the transmitter UE, a request for a HARQ response for the PSSCH from a PSFCH resource in the first resource pool; and transmit, to the transmitter UE, the HARQ response over the PSFCH resource in response to the PSSCH.

16. The receiver UE of claim 15, wherein the first resource pool is configured in a licensed carrier and the second resource pool is configured in an unlicensed carrier.

17. The receiver UE of claim 15, wherein the PSSCH is transmitted over a subchannel in the second resource pool and the HARQ response is received over the PSFCH resource corresponding to the subchannel.

18. The receiver UE of claim 15, wherein the first resource pool provides one PSFCH resource for each subchannel in the second resource pool.

19. The receiver UE of claim 15, wherein a mapping from a subchannel in the second resource pool to a PSFCH resource in the first resource pool is indicated via a frequency offset, when the first resource pool and the second resource pool have a same subcarrier spacing (SCS).

20. The receiver UE of claim 15, wherein the first resource pool is configured to provide a one-to-one mapping for a subset of subchannels in the second resource pool.

21. The receiver UE of claim 15, wherein a many-to-one mapping is provided from subchannels in the second resource pool to the PSFCH resources in the first resource pool.

22. The receiver UE of claim 15, wherein the first resource pool is configured via a radio resource control (RRC) signaling to a set of UEs comprising the transmitter UE and the receiver UE.

23. The receiver UE of claim 15, wherein the one or more processors are further configured to execute the instructions and cause the receiver UE to transmit an indication indicating the HARQ response is supported in the second resource pool via a one-to-one mapped first resource pool.

24. The receiver UE of claim 15, wherein the one or more processors are further configured to execute the instructions and cause the receiver UE to transmit an indication, via a radio resource control (RRC) signaling, indicating to utilize the first resource pool to support the HARQ response in the second resource pool that does not provide time divisional multiplexed (TDMed) PSFCH resources.

25. The receiver UE of claim 15, wherein the one or more processors are further configured to execute the instructions and cause the receiver UE to transmit an indication indicating the second resource pool supports the HARQ response via PSFCH occasions and the first resource pool in parallel.

26. The receiver UE of claim 15, wherein the first resource pool is associated with multiple second resource pools.

27. The receiver UE of claim 15, wherein a Zadoff-Chu (ZC) sequence based waveform is specified together with a PSFCH transmission carrying the HARQ response over the first resource pool.

28. The receiver UE of claim 15, wherein the first resource pool is associated with a band allowing other than a load based equipment (LBE) based channel access.

29. A method for wireless communications by a transmitter user equipment (UE), comprising:

receiving, from a network entity, a configuration of a first resource pool associated with a second resource pool, wherein the first resource pool and the second resource pool are configured in different carriers, wherein the second resource pool comprises physical sidelink shared channel (PSSCH) resources for PSSCH transmissions and the first resource pool comprises physical sidelink feedback channel (PSFCH) resources for hybrid automatic repeat request (HARQ) responses for the PSSCH transmissions in the second resource pool;

transmitting, to a receiver UE, a PSSCH on a PSSCH resource in the second resource pool;

transmitting, to the receiver UE, a request for a HARQ response for the PSSCH from a PSFCH resource in the first resource pool; and receiving, from the receiver UE, the HARQ response over the PSFCH resource in response to the PSSCH.

30. A method for wireless communications by a receiver user equipment (UE), comprising:

receiving a physical sidelink shared channel (PSSCH) on a PSSCH resource in a second resource pool from a transmitter UE configured with a configuration of a first resource pool associated with the second resource pool, wherein the first resource pool and the second resource pool are configured in different carriers, wherein the second resource pool comprises PSSCH resources for PSSCH transmissions and the first resource pool comprises physical sidelink feedback channel (PSFCH) resources for hybrid automatic repeat request (HARQ) responses for the PSSCH transmissions in the second resource pool;

receiving, from the transmitter UE, a request for a HARQ response for the PSSCH from a PSFCH resource in the first resource pool; and transmitting, to the transmitter UE, the HARQ response over the PSFCH resource in response to the PSSCH.

\* \* \* \* \*